United States Patent
Chou et al.

(10) Patent No.: US 8,982,483 B2
(45) Date of Patent: Mar. 17, 2015

(54) OPTICAL IMAGE CAPTURING LENS ASSEMBLY

(75) Inventors: Ming-Ta Chou, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 80 days.

(21) Appl. No.: 13/354,332

(22) Filed: Jan. 20, 2012

(65) Prior Publication Data
US 2013/0026352 A1    Jan. 31, 2013

(30) Foreign Application Priority Data
Jul. 29, 2011    (TW) .............................. 100127084 A

(51) Int. Cl.
G02B 9/34     (2006.01)
G02B 13/04    (2006.01)
G02B 3/02     (2006.01)
G02B 13/18    (2006.01)
G02B 13/00    (2006.01)

(52) U.S. Cl.
CPC .............. G02B 13/004 (2013.01); G02B 13/04 (2013.01); G02B 9/34 (2013.01)
USPC ............................. 359/773; 359/753; 359/715

(58) Field of Classification Search
USPC .......................... 359/715, 748, 753, 771–773
See application file for complete search history.

(56) References Cited

U.S. PATENT DOCUMENTS

| | | | |
|---|---|---|---|
| 5,325,235 A * | 6/1994 | Takashima et al. | 359/689 |
| 5,327,290 A * | 7/1994 | Fukushima et al. | 359/692 |
| 7,145,736 B2 | 12/2006 | Noda | |
| 7,365,920 B2 | 4/2008 | Noda | |
| 7,446,954 B2 * | 11/2008 | Sun | 359/773 |
| 2007/0070234 A1 * | 3/2007 | Sun | 348/335 |
| 2007/0242370 A1 | 10/2007 | Fukuta et al. | |
| 2008/0174884 A1 | 7/2008 | Liao | |
| 2009/0034099 A1 * | 2/2009 | Nakamura | 359/773 |

FOREIGN PATENT DOCUMENTS

| | | |
|---|---|---|
| CN | 101201448 A | 6/2008 |
| CN | 101295067 A | 10/2008 |
| CN | 101311765 A | 11/2008 |
| CN | 202486399 U | 10/2012 |
| JP | 2005-351972 A | 12/2005 |
| JP | 2009-3443 A | 1/2009 |
| TW | 200712540 | 4/2007 |

* cited by examiner

Primary Examiner — Thomas K Pham
Assistant Examiner — Cara Rakowski
(74) Attorney, Agent, or Firm — CKC & Partners Co., Ltd.

(57) ABSTRACT

An optical image capturing lens assembly includes four non-cemented lens elements, in order from an object side to an image side: a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power has a convex object-side surface and a convex image-side surface, and is made of plastic material, wherein the surfaces of the third lens element are aspheric. The fourth lens element with negative refractive power has a concave object-side surface and a convex image-side surface, and is made of plastic material, wherein the surfaces of the fourth lens element are aspheric.

19 Claims, 17 Drawing Sheets

OPTICAL IMAGE CAPTURING LENS ASSEMBLY

RELATED APPLICATIONS

The application claims priority to Taiwan Application Serial Number 100127084, filed Jul. 29, 2011, which is herein incorporated by reference.

BACKGROUND

1. Technical Field

The present invention relates to an optical image capturing lens assembly. More particularly, the present invention relates to a compact optical image capturing lens assembly applicable to electronic products.

2. Description of Related Art

In recent years, with the popularity of mobile products with camera functionalities, the demand for compact optical image capturing lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical image capturing lens assembly have gradually evolved toward higher megapixels, there is an increasing demand for compact optical image capturing lens assembly featuring better image quality.

A conventional compact optical image capturing lens assembly in a portable electronic product typically utilizes a three-element lens structure. Such a conventional optical image capturing lens assembly has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact optical image capturing lens assembly provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult.

SUMMARY

According to one aspect of the present disclosure, an optical image capturing lens assembly includes four non-cemented lens elements, in order from an object side to an image side: a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power has a convex object-side surface and a convex image-side surface, and is made of plastic material, wherein the object-side surface and the image-side surface of the third lens element are aspheric. The fourth lens element with negative refractive power has a concave object-side surface and a convex image-side surface, and is made of plastic material, wherein the object-side surface and the image-side surface of the fourth lens element are aspheric. When a curvature radius of the object-side surface of the third lens element is R5, a curvature radius of the image-side surface of the third lens element is R6, an axial distance between the second lens element and the third lens element is T23, and an axial distance between the third lens element and the fourth lens element is T34, the following relationships are satisfied:

$$-20 < R5/R6 < -1.4; \text{ and}$$

$$0.1 < T23/T34 < 6.5.$$

According to another aspect of the present disclosure, an optical image capturing lens assembly includes four non-cemented lens elements, in order from an object side to an image side: a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power has a convex object-side surface and a convex image-side surface, and is made of plastic material, wherein the object-side surface and the image-side surface of the third lens element are aspheric. The fourth lens element with negative refractive power has a concave object-side surface and a convex image-side surface, and is made of plastic material, wherein the object-side surface and the image-side surface of the fourth lens element are aspheric. When the refractive index of the first lens element is N1, the refractive index of the second lens element is N2, a curvature radius of the object-side surface of the third lens element is R5, and a curvature radius of the image-side surface of the third lens element is R6, the following relationships are satisfied:

$$-0.25 < N1 - N2 < 0; \text{ and}$$

$$-0.1 < (R5+R6)/(R5-R6) < 1.$$

DETAILED DESCRIPTION

Figure 1:
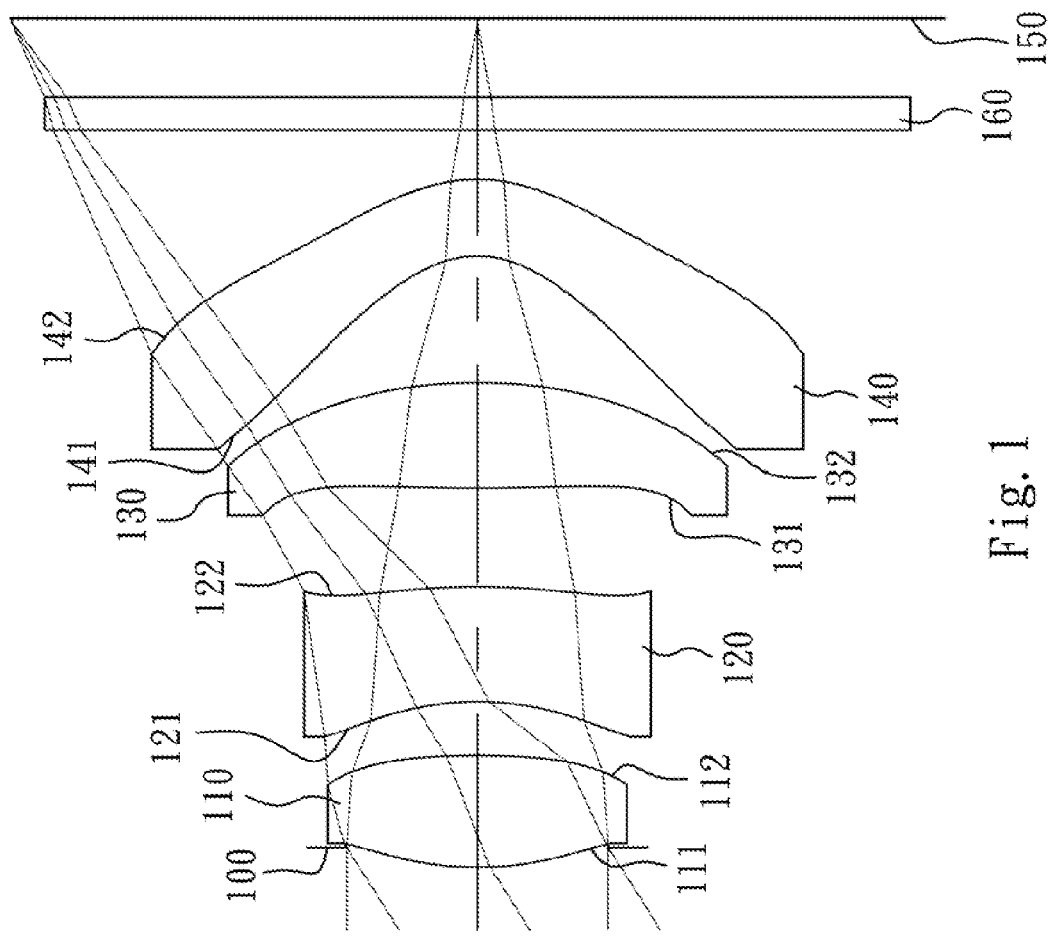
FIG. 1 is a schematic view of an optical image capturing lens assembly according to the first embodiment of the present disclosure.

An optical image capturing lens assembly includes, in order from an object side to an image side, a first lens element, a second lens element, a third lens element and a fourth lens element. The first lens element, the second lens element, the third lens element and the fourth lens element are four non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the optical image capturing lens assembly. Therefore, the optical image capturing lens assembly of the present disclosure provides four non-cemented lens elements for improving the problem generated by the cemented lens elements.

The first lens element with positive refractive power provides partial refractive power for reducing the total track length of the optical image capturing lens assembly. The first lens element can have a convex object-side surface and a convex image-side surface, or a convex object-side surface and a concave image-side surface. When the first lens element has a convex object-side surface and a concave image-side surface, the astigmatism of the optical image capturing lens assembly can be corrected. When the first lens element has a convex object-side surface and a convex image-side surface, the refractive power of the first lens element can be enhanced for reducing the total track length of the optical image capturing lens assembly.

The second lens element with negative refractive power can correct the aberration generated from the first lens element with positive refractive power. The second lens element has a concave object-side surface and a convex image-side surface, so that the astigmatism of the optical image capturing lens assembly can be corrected while retaining high image quality.

The third lens element with positive refractive power has a convex object-side surface and a convex image-side surface. Therefore, the distribution of the positive refractive power of the first lens element can be provided for reducing the photosensitivity of the optical image capturing lens assembly.

The fourth lens element with negative refractive power has a concave object-side surface and a convex image-side surface, so that the astigmatism and the high-order aberration of the optical image capturing lens assembly can be corrected. Furthermore, the optical image capturing lens assembly can have telephoto effect by the fourth lens element with negative refractive power and the third lens element with positive refractive power, so that the back focal length and the total track length of the optical image capturing lens assembly can be reduced.

When a curvature radius of the object-side surface of the third lens element is R5, and a curvature radius of the image-side surface of the third lens element is R6; the following relationships are satisfied:

$$-20 < R5/R6 < -1.4; \text{ and}$$

$$-0.1 < (R5+R6)/(R5-R6) < 1.$$

Therefore, the refractive power of the third lens element can reduce the photosensitivity of the optical image capturing lens assembly.

R5 and R6 can further satisfy the following relationship:

$$0.2 < (R5+R6)/(R5-R6) < 0.9.$$

When an axial distance between the second lens element and the third lens element is T23, and an axial distance between the third lens element and the fourth lens element is T34, the following relationship is satisfied:

$$0.1 < T23/T34 < 6.5.$$

Therefore, the fabrication of the lens elements can be easier due to the distance between of the lens elements, and the total track length also can be reduced.

T23 and T34 can further satisfy the following relationship:

$$0.5 < T23/T34 < 3.1.$$

When a curvature radius of the object-side surface of the second lens element is R3, and a curvature radius of the image-side surface of the second lens element is R4, the following relationship is satisfied:

$$-3.5 < (R3+R4)/(R3-R4) < -1.0.$$

Therefore, the curvature of the surfaces of the second lens element can correct the aberration generated from the first lens element, and the refractive power of the second lens element would not be too large, so that the photosensitivity of the optical image capturing lens assembly can be reduced.

When a curvature radius of the object-side surface of the fourth lens element is R7, and a focal length of the optical image capturing lens assembly is f, the following relationship is satisfied:

$$-0.6 < R7/f < 0.$$

Therefore, the refractive power of the fourth lens element is proper by adjusting the curvature of the object-side surface thereof, so that the high-order aberration of the optical image capturing lens assembly can be corrected.

When the Abbe number of the first lens element is V1, and the Abbe number of the second lens element is V2, the following relationship is satisfied:

$$30<V1-V2<42.$$

Therefore, the chromatic aberration of the optical image capturing lens assembly can be corrected.

When the focal length of the optical image capturing lens assembly is f, and a focal length of the second lens element is f2, the following relationship is satisfied:

$$-0.9<f/f2<-0.3.$$

Therefore, the refractive power of the second lens element can correct the aberration of the first lens element.

When the refractive index of the first lens element is N1, and the refractive index of the second lens element is N2, the following relationship is satisfied:

$$-0.25<N1-N2<0.$$

Therefore, the option of the optical plastic material of the first lens element and the second lens element for matching the lens elements is easier.

When a central thickness of the third lens element is CT3, and the focal length of the optical image capturing lens assembly is f, the following relationship is satisfied:

$$0.1<CT3/f<0.5.$$

Therefore, the thickness of the third lens element is proper, so that the manufacture of the third lens element is easier and the total track length of the optical image capturing lens assembly can be reduced.

When the focal length of the optical image capturing lens assembly is f, and a focal length of the fourth lens element is f4, the following relationship is satisfied:

$$-2.5<f/f4<-0.75.$$

Therefore, the refractive power of the fourth lens element is proper for correcting the high-order aberration.

When a curvature radius of the object-side surface of the first lens element is R1, and the focal length of the optical image capturing lens assembly is f, the following relationship is satisfied:

$$0.2<R1/f<1.0.$$

If R1/f being too small, the aberration would be generated due to the excessive positive refractive power of the first lens element. If R1/f being too large, the total track length of the optical image capturing lens assembly cannot be reduced easily due to the insufficient positive refractive power of the first lens element. Therefore, when the R1/f satisfies the above relationship, the aberration and the total track length of the optical image capturing lens assembly can be reduced.

When a curvature radius of the object-side surface of the fourth lens element is R7, and a curvature radius of the image-side surface of the fourth lens element is R8, the following relationship is satisfied:

$$-3.0<(R7+R8)/(R7-R8)<-1.0.$$

Therefore, the refractive power of the fourth lens element is proper by adjusting the curvature of the surfaces thereof.

The optical image capturing lens assembly further includes an image sensor located on an image plane. When a maximum image height of the optical image capturing lens assembly is ImgH, and an axial distance between the object-side surface of the first lens element and the image plane is TTL, the following relationship is satisfied:

$$TTL/ImgH<1.95.$$

Therefore, the total track length of the optical image capturing lens assembly can be reduced, so as to maintain the compact size of the image capturing optical lens assembly. As a result, the image capturing optical lens assembly may be employed in lightweight and portable electronic products.

According to the optical image capturing lens assembly of the present disclosure, the lens element can be made of glass material or plastic material. When the lens element is made of glass material, there is a higher degree of freedom in setting the parameters in distribution of the refractive power of the optical image capturing lens assembly. When the lens element is made of plastic material, the cost of manufacture can be effectively reduced. Moreover, the surface of the lens element can be aspheric, so that it is easier to make the surface into other non-spherical shapes. As a result, more controllable variables are obtained, while reducing the aberration and the number of required lens elements. Therefore, the total track length of the optical image capturing lens assembly can also be reduced.

According to the optical image capturing lens assembly of the present disclosure, when the lens element has a convex surface, it indicates that the paraxial region of the surface is convex, and when the lens element has a concave surface, it indicates that the paraxial region of the surface is concave.

According to the optical image capturing lens assembly of the present disclosure, the optical image capturing lens assembly can include at least one stop for reducing stray light or other functionalities. Furthermore, when the stop is an aperture stop, the position of the aperture stop can be arbitrarily placed in front of the entire optical system or within the optical system according to the preference of the designer, in order to achieve the desirable optical features or higher image quality produced from the optical system.

According to the above description of the present disclosure, the following 1st-8th specific embodiments are provided for further explanation.

Figure 2:
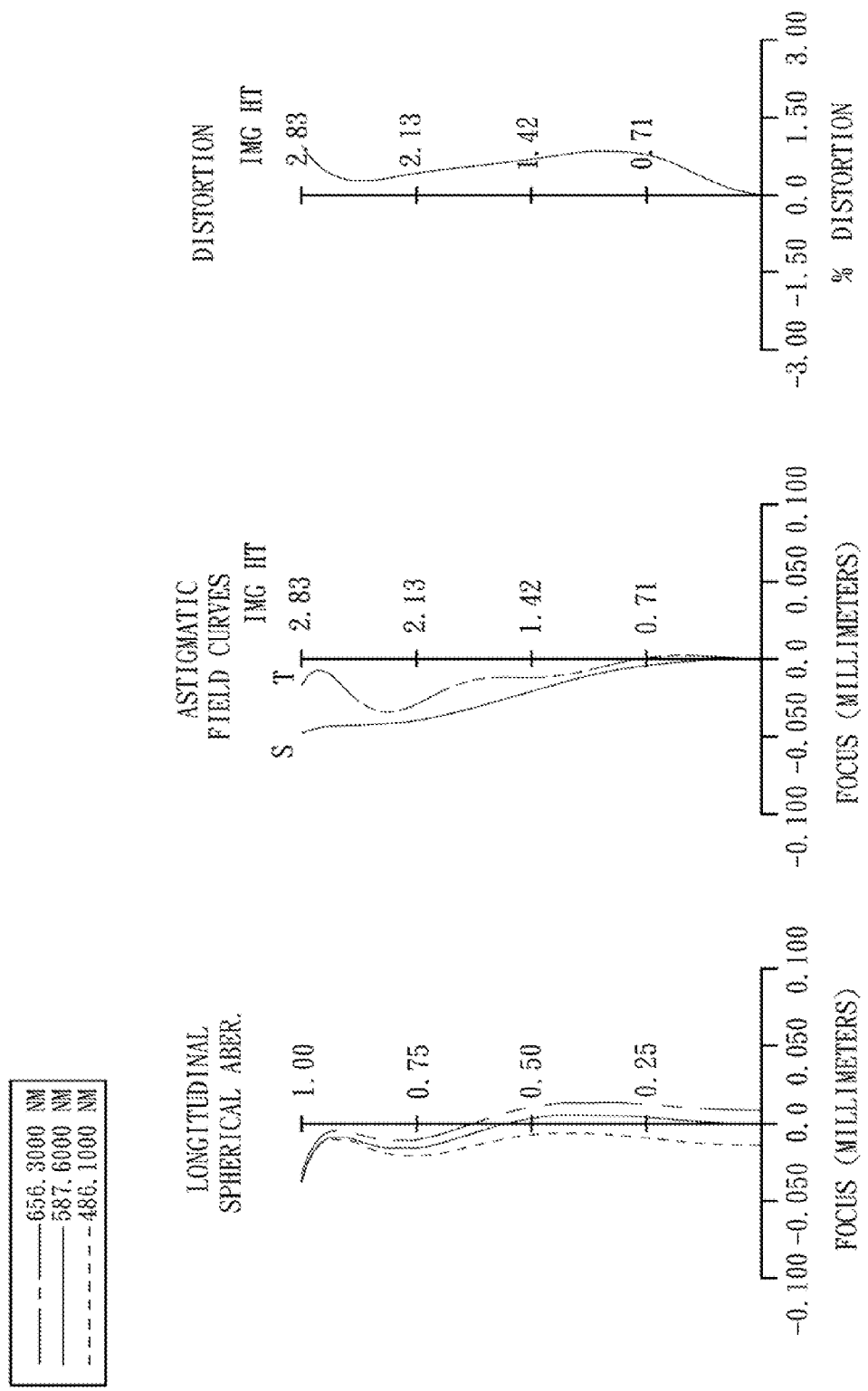
FIG. 2 shows spherical aberration curves, astigmatic field curves and a distortion curve of the optical image capturing lens assembly according to the first embodiment.

FIG. 1 is a schematic view of an optical image capturing lens assembly according to the first embodiment of the present disclosure. FIG. 2 shows spherical aberration curves, astigmatic field curves and a distortion curve of the optical image capturing lens assembly according to the first embodiment. In FIG. 1, the optical image capturing lens assembly includes, in order from an object side to an image side, an aperture stop 100, the first lens element 110, the second lens element 120, the third lens element 130, the fourth lens element 140, an IR (infrared) cut filter 160 and an image plane 150. The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a concave object-side surface 121 and a convex image-side surface 122, and is made of plastic material. The object-side surface 121 and the image-side surface 122 of the second lens element 120 are aspheric.

Figure 17:
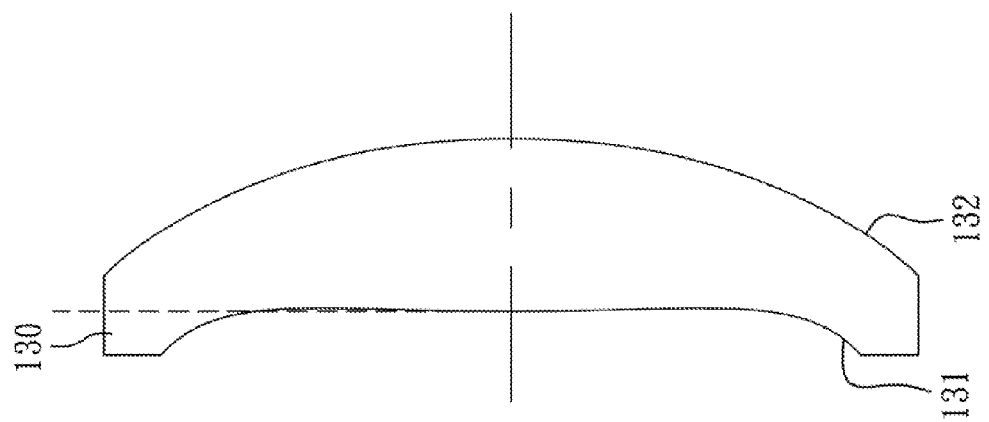
FIG. 17 is an enlarged view of the third lens element of the optical image capturing lens assembly of FIG. 1.

The third lens element 130 with positive refractive power has a convex object-side surface 131 and a convex image-side surface 132, (shown in FIG. 17 which is an enlarged view of the third lens element 130 of the optical image capturing lens assembly of FIG. 1) and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The IR cut filter 160 is made of glass and located between the fourth lens element 140 and the image plane 150, and will not affect the focal length of the optical image capturing lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing lens assembly according to the first embodiment, when a focal length of the optical image capturing lens assembly is f, an f-number of the optical image capturing lens assembly is Fno, and a half of the maximal field of view is HFOV, these parameters have the following values:

$f$=4.47 mm;

Fno=2.82; and

HFOV=32.2 degrees.

In the optical image capturing lens assembly according to the first embodiment, when the Abbe number of the first lens element is V1, and the Abbe number of the second lens element is V2, the following relationship is satisfied:

$V1-V2$=32.4.

In the optical image capturing lens assembly according to the first embodiment, when the refractive index of the first lens element 110 is N1, and the refractive index of the second lens element 120 is N2, the following relationship is satisfied:

$N1-N2$=−0.103.

In the optical image capturing lens assembly according to the first embodiment, when a central thickness of the third lens element 130 is CT3, and the focal length of the optical image capturing lens assembly is f, the following relationship is satisfied:

$CT3/f$=0.14.

In the optical image capturing lens assembly according to the first embodiment, when an axial distance between the second lens element 120 and the third lens element 130 is T23, and an axial distance between the third lens element 130 and the fourth lens element 140 is T34, the following relationships are satisfied:

$T23/T34$=0.78.

In the optical image capturing lens assembly according to the first embodiment, when the focal length of the optical image capturing lens assembly is f, a curvature radius of the object-side surface 111 of the first lens element 110 is R1, a curvature radius of the object-side surface 121 of the second lens element 120 is R3, and a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following relationships are satisfied:

$R1/f$=0.43;

$R7/f$=−0.14;

$R5/R6$=−3.75;

$(R3+R4)/(R3-R4)$=−2.65;

$(R5+R6)/(R5-R6)$=0.58; and $(R7+R8)/(R7-R8)$=−4.35.

In the optical image capturing lens assembly according to the first embodiment, when the focal length of the optical image capturing lens assembly is f, a focal length of the second lens element 120 is f2, and a focal length of the fourth lens element 140 is f4, the following relationships are satisfied:

$f/f2$=−0.78; and $f/f4$=−0.81.

In the optical image capturing lens assembly according to the first embodiment, the optical image capturing lens assembly further includes an image sensor located on an image plane. When a maximum image height of the optical image capturing lens assembly is ImgH, and an axial distance between the object-side surface 111 of the first lens element 110 and the image plane 150 is TTL, the following relationship is satisfied:

$TTL/$ImgH=1.79.

The detailed optical data of the first embodiment are shown in Table 1 and the aspheric surface data are shown in Table 2 below.

TABLE 1

1st Embodiment
f = 4.47 mm, Fno = 2.82, HFOV = 32.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.120 | | | | |
| 2 | Lens 1 | 1.922470 (ASP) | 0.678 | Plastic | 1.530 | 55.8 | 2.68 |
| 3 | | −4.750900 (ASP) | 0.323 | | | | |

TABLE 1-continued

1st Embodiment
f = 4.47 mm, Fno = 2.82, HFOV = 32.2 deg.

| Surface # | | Curvature Radius | Thickness | Material | Index | Abbe # | Focal length |
|---|---|---|---|---|---|---|---|
| 4 | Lens 2 | −1.737190 (ASP) | 0.698 | Plastic | 1.633 | 23.4 | −5.74 |
| 5 | | −3.845100 (ASP) | 0.601 | | | | |
| 6 | Lens 3 | 12.254900 (ASP) | 0.639 | Plastic | 1.530 | 55.8 | 4.94 |
| 7 | | −3.267400 (ASP) | 0.769 | | | | |
| 8 | Lens 4 | −0.612750 (ASP) | 0.462 | Plastic | 1.530 | 55.8 | −5.51 |
| 9 | | −0.978240 (ASP) | 0.300 | | | | |
| 10 | IR-filter | Plano | 0.200 | Glass | 1.516 | 64.1 | — |
| 11 | | Plano | 0.476 | | | | |
| 12 | Image | Plano | — | | | | |

Note:
Reference wavelength (d-line) is 587.6 nm

TABLE 2

Aspheric Coefficients

| Surface # | 2 | 3 | 4 | 5 |
|---|---|---|---|---|
| k = | −1.84204E+00 | 1.82053E+01 | 5.74423E−01 | 5.56985E+00 |
| A4 = | −2.82630E−03 | −4.64889E−02 | 7.90065E−02 | 8.33104E−02 |
| A6 = | −2.84401E−02 | −7.72824E−02 | −5.88125E−02 | 7.34441E−03 |
| A8 = | −7.93381E−03 | 4.01797E−02 | 1.19258E−01 | −1.36377E−02 |
| A10 = | −8.26703E−02 | −2.84651E−02 | −2.29108E−02 | 4.25786E−02 |
| A12 = | −4.39349E−08 | −8.03451E−08 | −8.09628E−08 | −1.15569E−02 |

| Surface # | 6 | 7 | 8 | 9 |
|---|---|---|---|---|
| k = | −2.00000E+01 | 5.17658E−01 | −1.31508E+00 | −1.78553E+00 |
| A4 = | −2.47682E−02 | −2.37726E−02 | 5.57452E−02 | 8.06527E−02 |
| A6 = | −2.36855E−02 | −1.93456E−02 | −4.86269E−03 | −1.54248E−02 |
| A8 = | 7.64339E−03 | 2.40815E−02 | 3.15268E−03 | −1.40563E−03 |
| A10 = | −5.22662E−03 | −8.98897E−03 | −1.09902E−03 | 3.97302E−04 |
| A12 = | −1.56859E−03 | 9.47315E−04 | 2.88826E−05 | −2.72688E−05 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th order. This information related to Table 1 and Table 2 applies also to the Tables for the remaining embodiments, and so an explanation in this regard will not be provided again.

Figure 3:
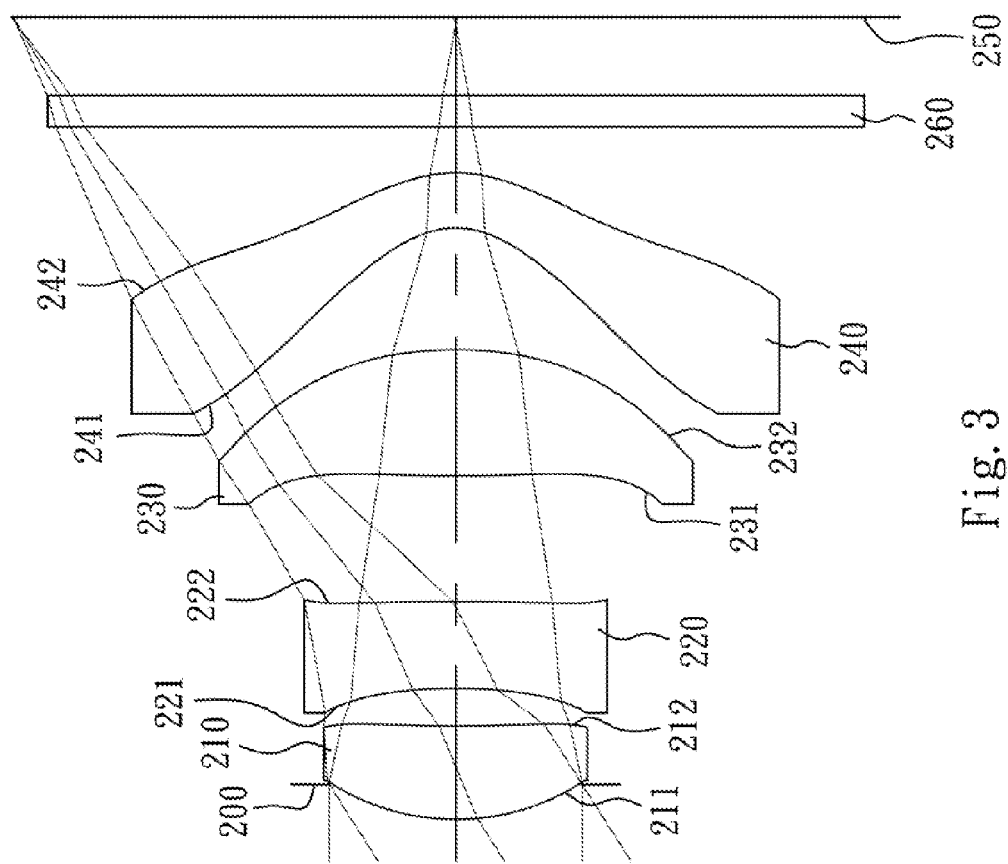
FIG. 3 is a schematic view of an optical image capturing lens assembly according to the second embodiment of the present disclosure.
Figure 4:
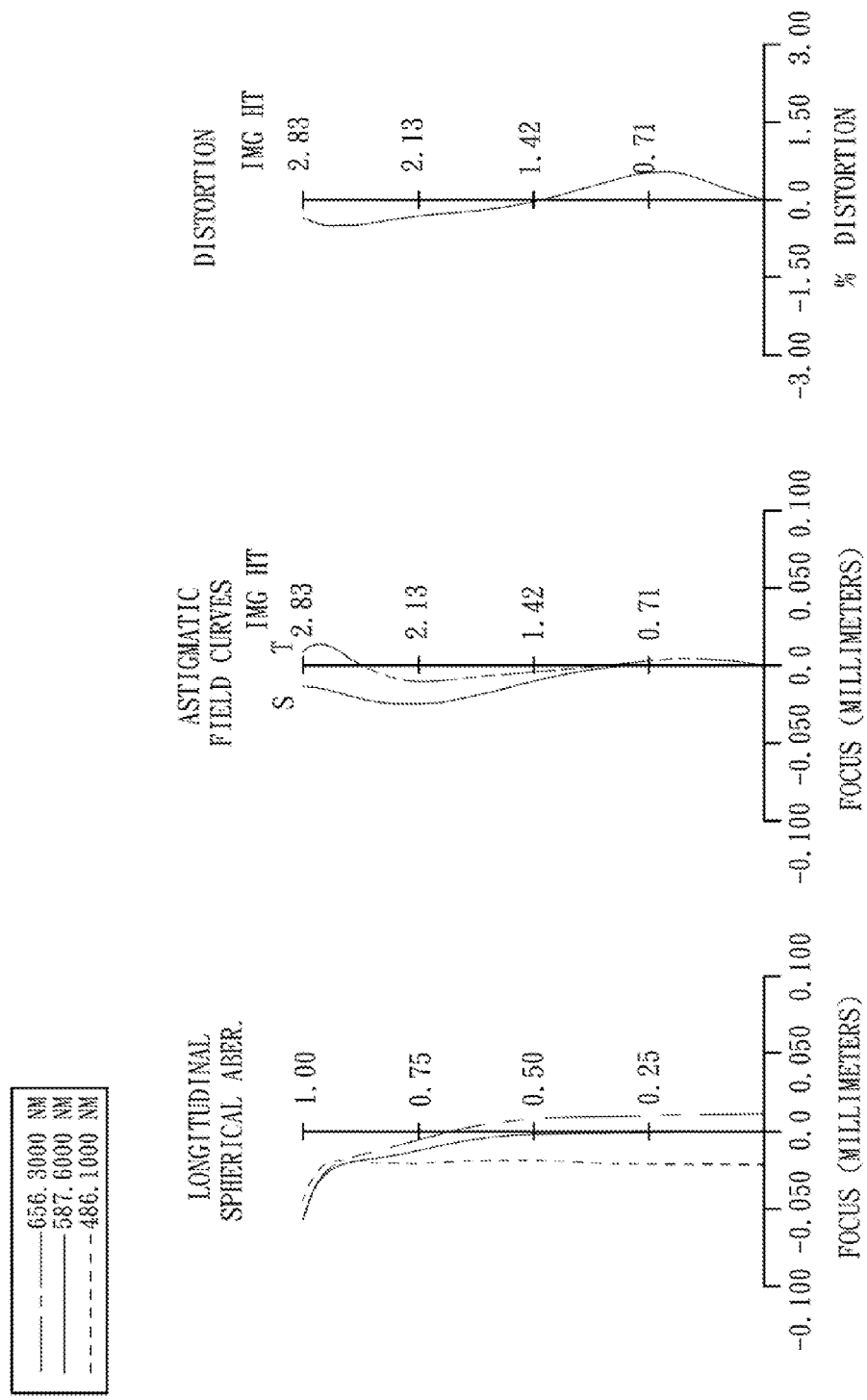
FIG. 4 shows spherical aberration curves, astigmatic field curves and a distortion curve of the optical image capturing lens assembly according to the second embodiment.

FIG. 3 is a schematic view of an optical image capturing lens assembly according to the second embodiment of the present disclosure. FIG. 4 shows spherical aberration curves, astigmatic field curves and a distortion curve of the optical image capturing lens assembly according to the second embodiment. In FIG. 3, the optical image capturing lens assembly includes, in order from an object side to an image side, an aperture stop 200, the first lens element 210, the second lens element 220, the third lens element 230, the fourth lens element 240, an IR cut filter 260 and an image plane 250.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a concave object-side surface 221 and a convex image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The IR cut filter 260 is made of glass and located between the fourth lens element 240 and the image plane 250, and will not affect the focal length of the optical image capturing lens assembly.

The equation of the aspheric surface profiles of the above lens elements of the second embodiment is the same as that of the first embodiment, and will not be stated herein again.

The detailed optical data of the second embodiment are shown in Table 3 and the aspheric surface data are shown in Table 4 below.

TABLE 3

2nd Embodiment
f = 4.54 mm, Fno = 2.80, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.225 | | | | |
| 2 | Lens 1 | 1.523180 (ASP) | 0.600 | Plastic | 1.530 | 55.8 | 3.36 |
| 3 | | 9.174300 (ASP) | 0.241 | | | | |
| 4 | Lens 2 | −3.522900 (ASP) | 0.557 | Plastic | 1.633 | 23.4 | −6.91 |
| 5 | | −19.230800 (ASP) | 0.807 | | | | |
| 6 | Lens 3 | 9.245600 (ASP) | 0.810 | Plastic | 1.544 | 55.9 | 3.68 |
| 7 | | −2.480290 (ASP) | 0.782 | | | | |
| 8 | Lens 4 | −0.543420 (ASP) | 0.350 | Plastic | 1.530 | 55.8 | −4.06 |
| 9 | | −0.888940 (ASP) | 0.300 | | | | |
| 10 | IR-filter | Plano | 0.200 | Glass | 1.516 | 64.1 | — |
| 11 | | Plano | 0.499 | | | | |
| 12 | Image | Plano | — | | | | |

Note:
Reference wavelength (d-line) is 587.6 nm

TABLE 4

Aspheric Coefficients

| Surface # | 2 | 3 | 4 | 5 |
|---|---|---|---|---|
| k = | −5.41267E−01 | −1.79395E+01 | 1.06770E+01 | 1.79481E+02 |
| A4 = | 2.79529E−02 | −3.45710E−02 | −4.86287E−02 | −1.21020E−02 |
| A6 = | 5.40160E−03 | −5.87117E−02 | −3.65322E−02 | 4.33628E−02 |
| A8 = | 4.11123E−02 | 8.93090E−02 | 1.40625E−01 | −6.60412E−03 |
| A10 = | −4.74664E−02 | −1.68990E−01 | −1.67385E−01 | 2.57722E−02 |
| A12 = | 1.59605E−03 | −1.41694E−03 | −5.18903E−04 | −1.72299E−05 |

| Surface # | 6 | 7 | 8 | 9 |
|---|---|---|---|---|
| k = | −2.00000E+01 | 7.64142E−01 | −1.57920E+00 | −2.50088E+00 |
| A4 = | −5.23345E−02 | −3.57901E−02 | 1.18216E−02 | 9.32042E−02 |
| A6 = | −1.30897E−02 | −1.93007E−02 | 8.60935E−03 | −2.18315E−02 |
| A8 = | 7.54020E−04 | 1.96426E−02 | 3.53890E−03 | 1.37442E−05 |
| A10 = | −4.44574E−03 | −6.48706E−03 | −2.10258E−03 | 4.37451E−04 |
| A12 = | 1.09749E−03 | 1.12394E−03 | 2.56223E−04 | −3.86123E−05 |

In the optical image capturing lens assembly according to the second embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the second embodiment. Moreover, these parameters can be calculated from Table 3 as the following values and satisfy the following relationships:

| f (mm) | 4.54 |
|---|---|
| FNO | 2.80 |
| HFOV (deg.) | 32.1 |
| V1 − V2 | 32.4 |
| N1 − N2 | −0.103 |
| CT3/f | 0.18 |
| T23/T34 | 1.03 |
| R1/f | 0.34 |
| R7/f | −0.12 |
| R5/R6 | −3.73 |
| (R3 + R4)/(R3 − R4) | −1.45 |
| (R5 + R6)/(R5 − R6) | 0.58 |
| (R7 + R8)/(R7 − R8) | −4.15 |
| f/f2 | −0.66 |
| f/f4 | −1.12 |
| TTL/ImgH | 1.79 |

Figure 5:
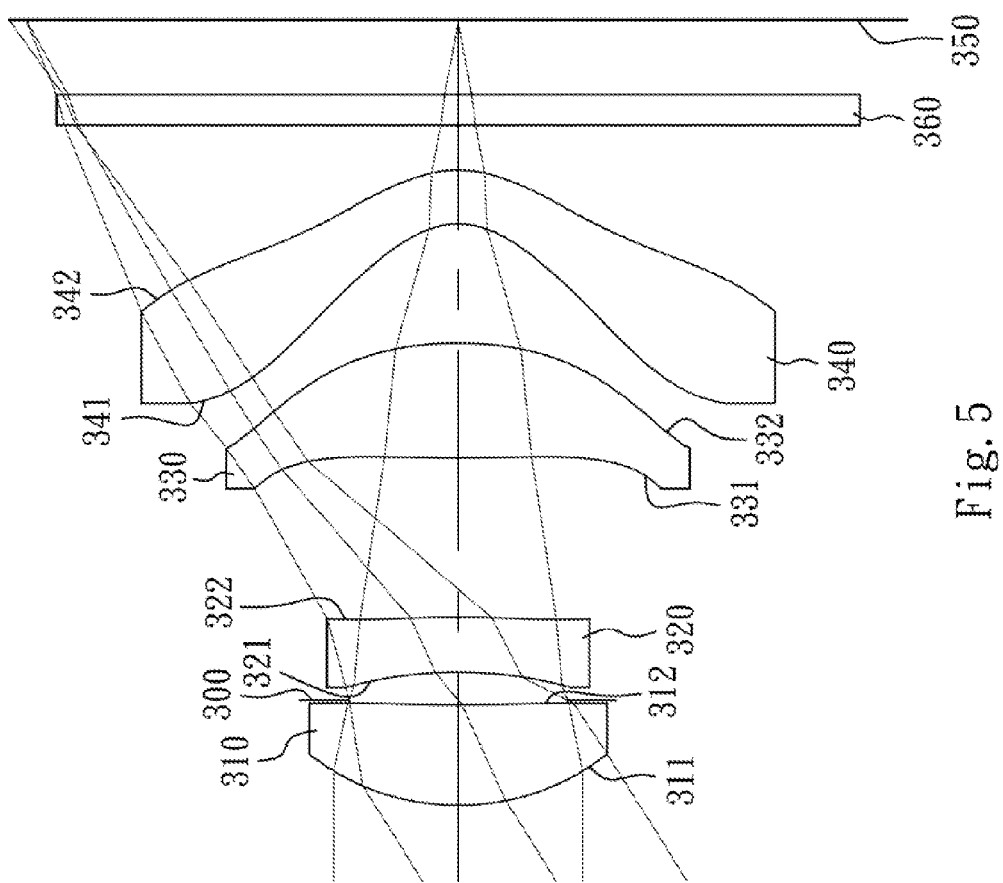
FIG. 5 is a schematic view of an optical image capturing lens assembly according to the third embodiment of the present disclosure.
Figure 6:
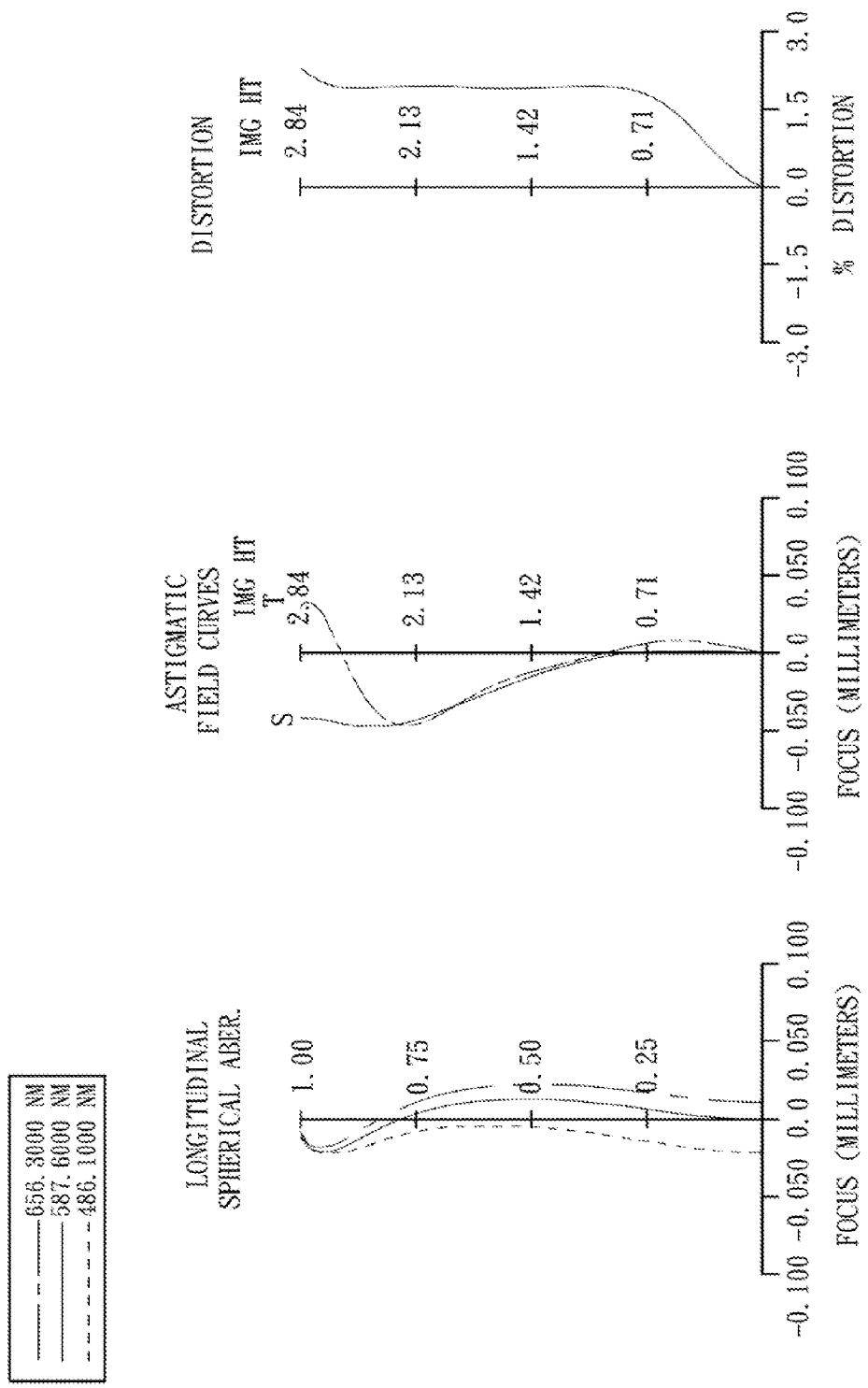
FIG. 6 shows spherical aberration curves, astigmatic field curves and a distortion curve of the optical image capturing lens assembly according to the third embodiment.

FIG. 5 is a schematic view of an optical image capturing lens assembly according to the third embodiment of the present disclosure. FIG. 6 shows spherical aberration curves, astigmatic field curves and a distortion curve of the optical image capturing lens assembly according to the third embodiment. In FIG. 5, the optical image capturing lens assembly includes, in order from an object side to an image side, the first lens element 310, an aperture stop 300, the second lens element 320, the third lens element 330, the fourth lens element 340, an IR cut filter 360 and an image plane 350.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a concave object-side surface 321 and a convex image-side surface 322, and is made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The IR cut filter 360 is made of glass and located between the fourth lens element 340 and the image plane 350, and will not affect the focal length of the optical image capturing lens assembly.

The equation of the aspheric surface profiles of the above lens elements of the third embodiment is the same as that of the first embodiment, and will not be stated herein again.

The detailed optical data of the third embodiment are shown in Table 5 and the aspheric surface data are shown in Table 6 below.

TABLE 5

3rd Embodiment
f = 4.41 mm, Fno = 2.72, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.644710 (ASP) | 0.660 | Plastic | 1.544 | 55.9 | 3.38 |
| 2 | | 13.477100 (ASP) | 0.030 | | | | |
| 3 | Ape. Stop | Plano | 0.183 | | | | |
| 4 | Lens 2 | −3.014200 (ASP) | 0.362 | Plastic | 1.633 | 23.4 | −7.22 |
| 5 | | −9.259300 (ASP) | 1.047 | | | | |
| 6 | Lens 3 | 12.254900 (ASP) | 0.755 | Plastic | 1.544 | 55.9 | 3.65 |
| 7 | | −2.322520 (ASP) | 0.783 | | | | |
| 8 | Lens 4 | −0.511910 (ASP) | 0.350 | Plastic | 1.530 | 55.8 | −5.39 |
| 9 | | −0.771510 (ASP) | 0.300 | | | | |
| 10 | IR-filter | Plano | 0.200 | Glass | 1.516 | 64.1 | — |
| 11 | | Plano | 0.487 | | | | |
| 12 | Image | Plano | — | | | | |

Note:
Reference wavelength (d-line) is 587.6 nm

TABLE 6

Aspheric Coefficients

| Surface # | 1 | 2 | 4 | 5 |
|---|---|---|---|---|
| k = | −4.16658E−01 | −1.32537E+01 | 1.15755E+01 | 3.46475E+01 |
| A4 = | 3.24472E−02 | −1.09285E−02 | 1.45810E−02 | 4.12377E−02 |
| A6 = | −2.83450E−02 | −6.76472E−02 | 1.70327E−01 | 2.30880E−02 |
| A8 = | 4.22812E−02 | 1.15310E−01 | −3.26067E−01 | 8.42943E−03 |
| A10 = | 3.66356E−02 | −1.33886E−01 | 3.56218E−01 | −5.99071E−03 |
| A12 = | −5.27920E−02 | −1.41611E−03 | −5.18087E−04 | 7.68091E−03 |

| Surface # | 6 | 7 | 8 | 9 |
|---|---|---|---|---|
| k = | 6.02055E+00 | 9.57150E−01 | −1.45772E+00 | −2.01770E+00 |
| A4 = | −5.97230E−02 | −5.51631E−02 | 2.05557E−02 | 1.21808E−01 |
| A6 = | −3.27261E−03 | −1.06461E−02 | 1.49015E−02 | −3.04517E−02 |
| A8 = | −4.69127E−03 | 2.10422E−02 | 3.54236E−03 | 6.93535E−04 |
| A10 = | 2.73767E−04 | −5.48755E−03 | −2.26692E−03 | 4.70054E−04 |
| A12 = | −7.50415E−04 | 1.35302E−03 | 2.38317E−04 | −3.97141E−05 |

In the optical image capturing lens assembly according to the third embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the third embodiment. Moreover, these parameters can be calculated from Table 5 as the following values and satisfy the following relationships:

| f (mm) | 4.41 |
|---|---|
| FNO | 2.72 |
| HFOV (deg.) | 32.1 |
| V1 − V2 | 32.5 |
| N1 − N2 | −0.089 |
| CT3/f | 0.17 |
| T23/T34 | 1.34 |
| R1/f | 0.37 |
| R7/f | −0.12 |
| R5/R6 | −5.28 |
| (R3 + R4)/(R3 − R4) | −1.97 |
| (R5 + R6)/(R5 − R6) | 0.68 |
| (R7 + R8)/(R7 − R8) | −4.94 |
| f/f2 | −0.61 |
| f/f4 | −0.82 |
| TTL/ImgH | 1.80 |

Figure 7:
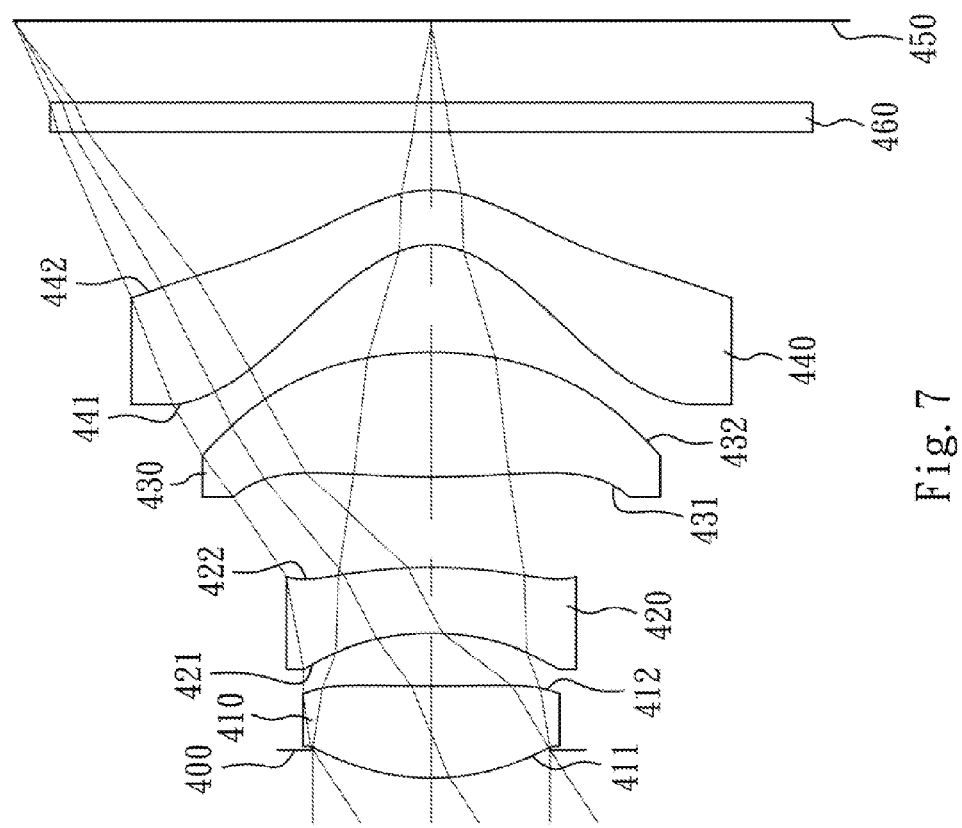
FIG. 7 is a schematic view of an optical image capturing lens assembly according to the fourth embodiment of the present disclosure.
Figure 8:
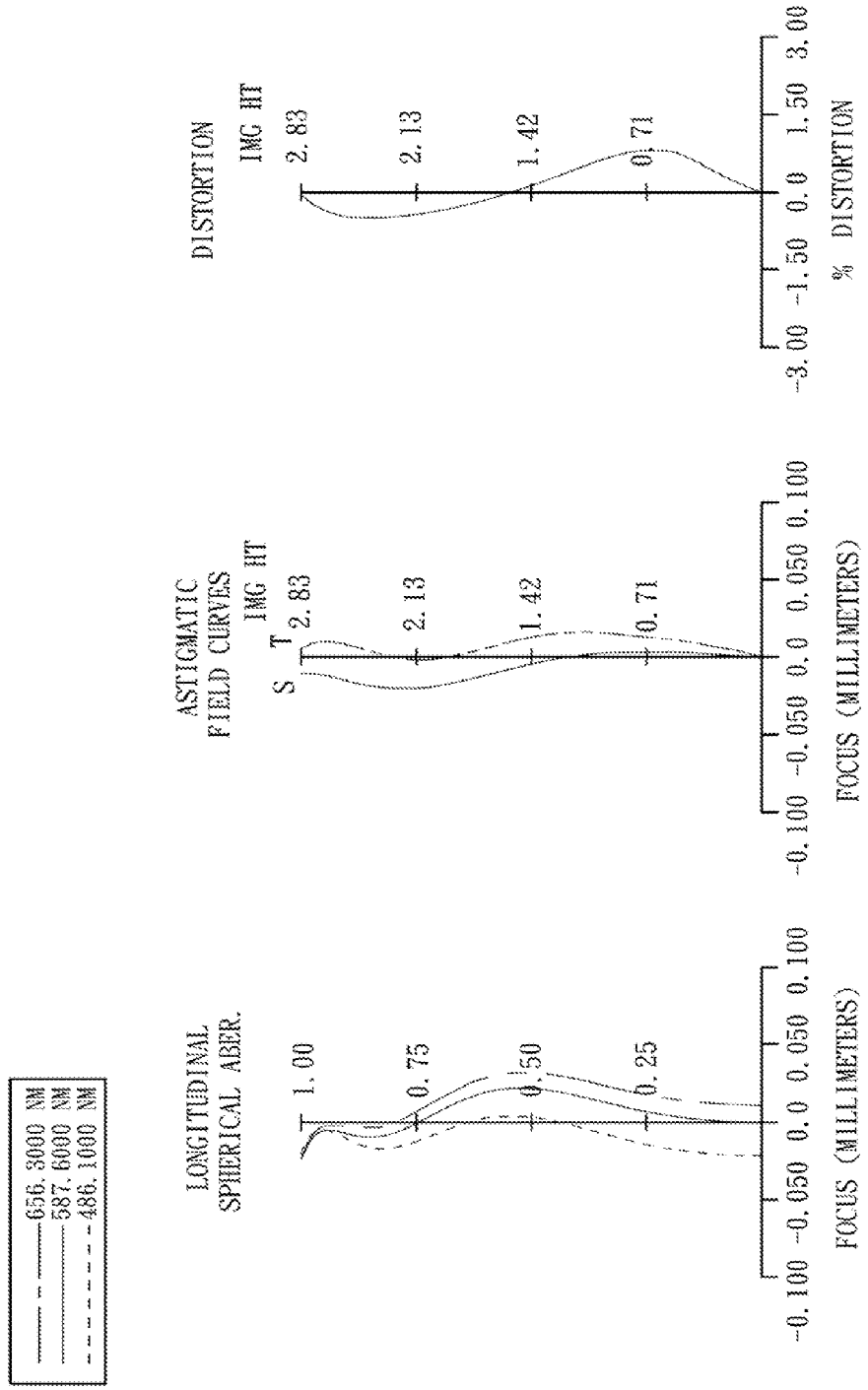
FIG. 8 shows spherical aberration curves, astigmatic field curves and a distortion curve of the optical image capturing lens assembly according to the fourth embodiment.

FIG. 7 is a schematic view of an optical image capturing lens assembly according to the fourth embodiment of the present disclosure. FIG. 8 shows spherical aberration curves, astigmatic field curves and a distortion curve of the optical image capturing lens assembly according to the fourth embodiment. In FIG. 7, the optical image capturing lens assembly includes, in order from an object side to an image side, an aperture stop 400, the first lens element 410, the second lens element 420, the third lens element 430, the fourth lens element 440, an IR cut filter 460 and an image plane 450.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a concave object-side surface 421 and a convex image-side surface 422, and is made of plastic material. The object-side surface 421 and the image-side surface 422 of the second lens element 420 are aspheric.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric. The IR cut filter 460 is made of glass and located between the fourth lens element 440 and the image plane 450, and will not affect the focal length of the optical image capturing lens assembly.

The equation of the aspheric surface profiles of the above lens elements of the fourth embodiment is the same as that of the first embodiment, and will not be stated herein again.

The detailed optical data of the fourth embodiment are shown in Table 7 and the aspheric surface data are shown in Table 8 below.

TABLE 7

4th Embodiment
f = 4.34 mm, Fno = 2.69, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.190 | | | | |
| 2 | Lens 1 | 1.612360 (ASP) | 0.625 | Plastic | 1.544 | 55.9 | 3.30 |
| 3 | | 13.477100 (ASP) | 0.357 | | | | |
| 4 | Lens 2 | −1.833720 (ASP) | 0.451 | Plastic | 1.633 | 23.4 | −6.38 |
| 5 | | −3.679200 (ASP) | 0.617 | | | | |
| 6 | Lens 3 | 5.848000 (ASP) | 0.850 | Plastic | 1.544 | 55.9 | 3.40 |
| 7 | | −2.570020 (ASP) | 0.732 | | | | |
| 8 | Lens 4 | −0.531460 (ASP) | 0.368 | Plastic | 1.530 | 55.8 | −4.74 |
| 9 | | −0.835910 (ASP) | 0.400 | | | | |
| 10 | IR-filter | Plano | 0.200 | Glass | 1.516 | 64.1 | — |
| 11 | | Plano | 0.555 | | | | |
| 12 | Image | Plano | — | | | | |

Note:
Reference wavelength (d-line) is 587.6 nm

TABLE 8

Aspheric Coefficients

| Surface # | 2 | 3 | 4 | 5 |
|---|---|---|---|---|
| k = | −6.96700E−01 | 6.63067E+00 | 2.09961E+00 | 6.27084E+00 |
| A4 = | 2.16327E−02 | −5.56811E−02 | −3.39280E−02 | −3.59175E−03 |
| A6 = | −3.48686E−02 | −1.07224E−01 | 3.08997E−02 | 4.98750E−02 |
| A8 = | 8.45450E−02 | 2.89332E−02 | 4.20019E−02 | 2.97319E−02 |
| A10 = | −1.18608E−01 | −4.95659E−02 | 6.62167E−02 | 3.47707E−02 |
| A12 = | 1.59520E−03 | −1.41754E−03 | −5.19517E−04 | −7.48993E−03 |

| Surface # | 6 | 7 | 8 | 9 |
|---|---|---|---|---|
| k = | 4.13705E+00 | −2.62461E+00 | −1.62426E+00 | −2.32671E+00 |
| A4 = | −6.39515E−02 | −4.62482E−02 | 1.35250E−02 | 9.53140E−02 |
| A6 = | 1.23186E−04 | −2.54651E−02 | 1.20152E−02 | −2.04111E−02 |
| A8 = | −8.21483E−03 | 2.19546E−02 | 3.86916E−03 | −1.00582E−04 |
| A10 = | −1.46453E−03 | −6.86056E−03 | −2.17725E−03 | 3.47033E−04 |
| A12 = | 6.31550E−04 | 8.12357E−04 | 2.47604E−04 | −1.30068E−05 |

In the optical image capturing lens assembly according to the fourth embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the fourth embodiment. Moreover, these parameters can be calculated from Table 7 as the following values and satisfy the following relationships:

| | |
|---|---|
| f (mm) | 4.34 |
| FNO | 2.69 |
| HFOV (deg.) | 33.1 |
| V1 − V2 | 32.5 |
| N1 − N2 | −0.089 |
| CT3/f | 0.20 |
| T23/T34 | 0.84 |
| R1/f | 0.37 |
| R7/f | −0.12 |
| R5/R6 | −2.28 |
| (R3 + R4)/(R3 − R4) | −2.99 |
| (R5 + R6)/(R5 − R6) | 0.39 |
| (R7 + R8)/(R7 − R8) | −4.49 |
| f/f2 | −0.68 |
| f/f4 | −0.92 |
| TTL/ImgH | 1.79 |

Figure 9:
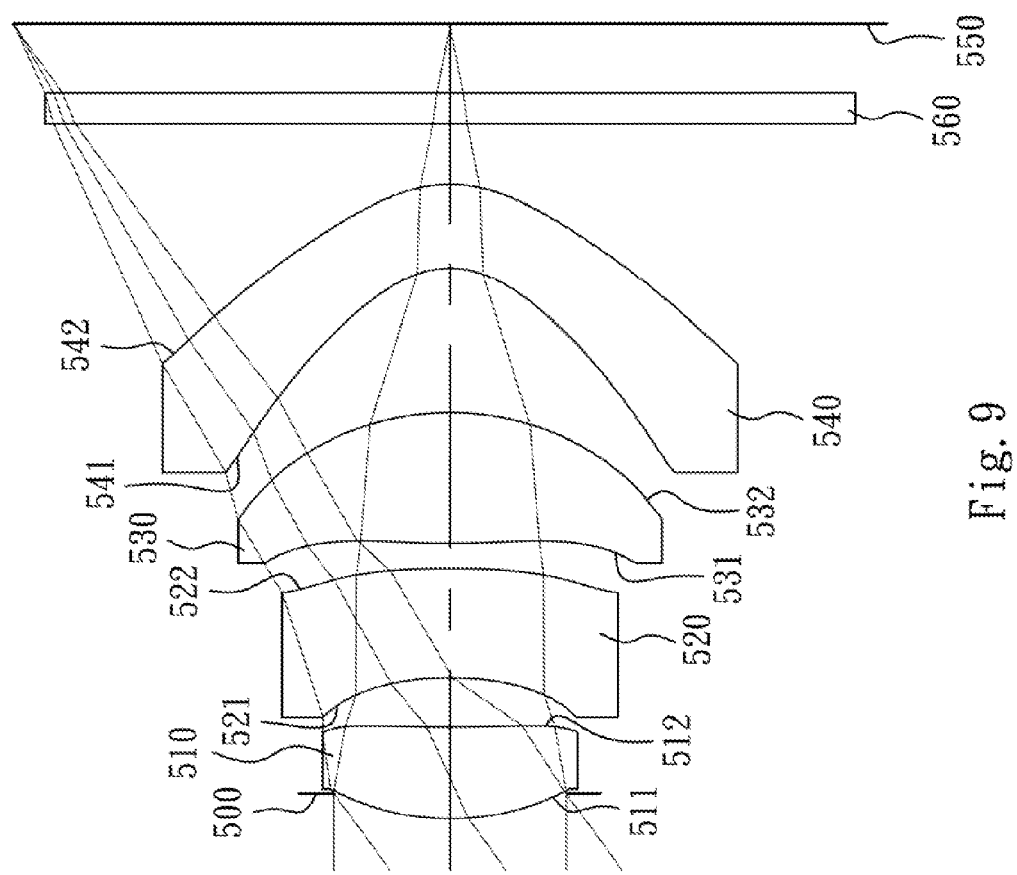
FIG. 9 is a schematic view of an optical image capturing lens assembly according to the fifth embodiment of the present disclosure.
Figure 10:
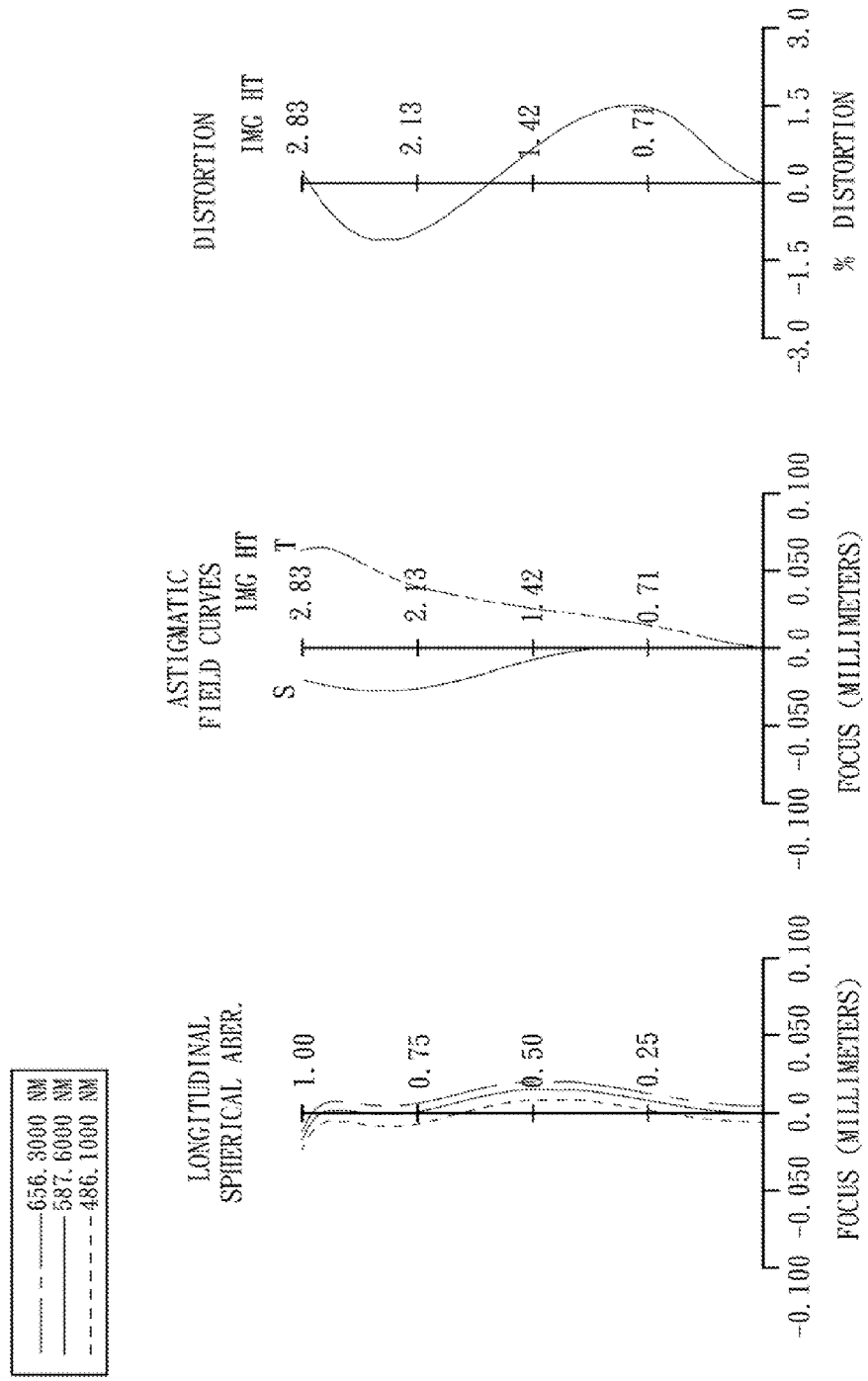
FIG. 10 shows spherical aberration curves, astigmatic field curves and a distortion curve of the optical image capturing lens assembly according to the fifth embodiment.

FIG. 9 is a schematic view of an optical image capturing lens assembly according to the fifth embodiment of the present disclosure. FIG. 10 shows spherical aberration curves, astigmatic field curves and a distortion curve of the optical image capturing lens assembly according to the fifth embodiment. In FIG. 9, the optical image capturing lens assembly includes, in order from an object side to an image side, an aperture stop 500, the first lens element 510, the second lens element 520, the third lens element 530, the fourth lens element 540, an IR cut filter 560 and an image plane 550.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a concave object-side surface 521 and a convex image-side surface 522, and is made of plastic material. The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The IR cut filter 560 is made of glass and located between the fourth lens element 540 and the image plane 550, and will not affect the focal length of the optical image capturing lens assembly.

The equation of the aspheric surface profiles of the above lens elements of the fifth embodiment is the same as that of the first embodiment, and will not be stated herein again.

The detailed optical data of the fifth embodiment are shown in Table 9 and the aspheric surface data are shown in Table 10 below.

TABLE 9

5th Embodiment
f = 3.88 mm, Fno = 2.57, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.165 | | | | |
| 2 | Lens 1 | 1.657330 (ASP) | 0.599 | Plastic | 1.544 | 55.9 | 3.48 |
| 3 | | 11.559900 (ASP) | 0.321 | | | | |
| 4 | Lens 2 | −2.074230 (ASP) | 0.711 | Plastic | 1.634 | 23.8 | −4.94 |
| 5 | | −6.957200 (ASP) | 0.161 | | | | |
| 6 | Lens 3 | 5.848000 (ASP) | 0.850 | Plastic | 1.544 | 55.9 | 2.60 |
| 7 | | −1.769790 (ASP) | 0.942 | | | | |
| 8 | Lens 4 | −0.571110 (ASP) | 0.544 | Plastic | 1.634 | 23.8 | −8.45 |
| 9 | | −0.875510 (ASP) | 0.400 | | | | |
| 10 | IR-filter | Plano | 0.200 | Glass | 1.516 | 64.1 | — |
| 11 | | Plano | 0.448 | | | | |
| 12 | Image | Plano | — | | | | |

Note:
Reference wavelength (d-line) is 587.6 nm

TABLE 10

Aspheric Coefficients

| Surface # | 2 | 3 | 4 | 5 |
|---|---|---|---|---|
| k = | −4.00865E−01 | 1.18667E+01 | 1.76855E+00 | 2.71049E+01 |
| A4 = | 2.31089E−02 | −2.71596E−02 | −9.46983E−02 | −1.28146E−01 |
| A6 = | −4.24326E−03 | −1.14517E−01 | 8.37322E−03 | 7.35707E−02 |
| A8 = | 4.21379E−02 | 9.40399E−02 | −1.38986E−01 | −1.11766E−02 |
| A10 = | −7.81835E−02 | −2.41208E−01 | −3.40376E−03 | −1.76765E−02 |
| A12 = | 1.59521E−03 | −1.41753E−03 | −5.19516E−04 | 2.66738E−02 |

TABLE 10-continued

| Aspheric Coefficients | | | | |
|---|---|---|---|---|
| Surface # | 6 | 7 | 8 | 9 |
| k = | −2.00000E+01 | −3.00950E+00 | −1.50876E+00 | −1.76701E+00 |
| A4 = | −1.27520E−01 | −3.88382E−02 | −6.53471E−04 | 5.36220E−02 |
| A6 = | 2.84294E−02 | −3.05973E−02 | −1.71469E−02 | −1.96310E−02 |
| A8 = | −8.42387E−03 | 1.67456E−02 | −2.73866E−03 | 5.86162E−04 |
| A10 = | −1.06406E−02 | −6.99149E−03 | −1.31050E−03 | 4.35792E−04 |
| A12 = | 6.21214E−03 | 8.38334E−04 | 1.75436E−03 | −9.52710E−06 |

In the optical image capturing lens assembly according to the fifth embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the fifth embodiment. Moreover, these parameters can be calculated from Table 9 as the following values and satisfy the following relationships:

| | |
|---|---|
| f (mm) | 3.88 |
| FNO | 2.57 |
| HFOV (deg.) | 36.1 |
| V1 − V2 | 32.1 |
| N1 − N2 | −0.090 |
| CT3/f | 0.22 |
| T23/T34 | 0.17 |
| R1/f | 0.43 |
| R7/f | −0.15 |
| R5/R6 | −3.30 |
| (R3 + R4)/(R3 − R4) | −1.85 |
| (R5 + R6)/(R5 − R6) | 0.54 |
| (R7 + R8)/(R7 − R8) | −4.75 |
| f/f2 | −0.79 |
| f/f4 | −0.46 |
| TTL/ImgH | 1.80 |

Figure 11:
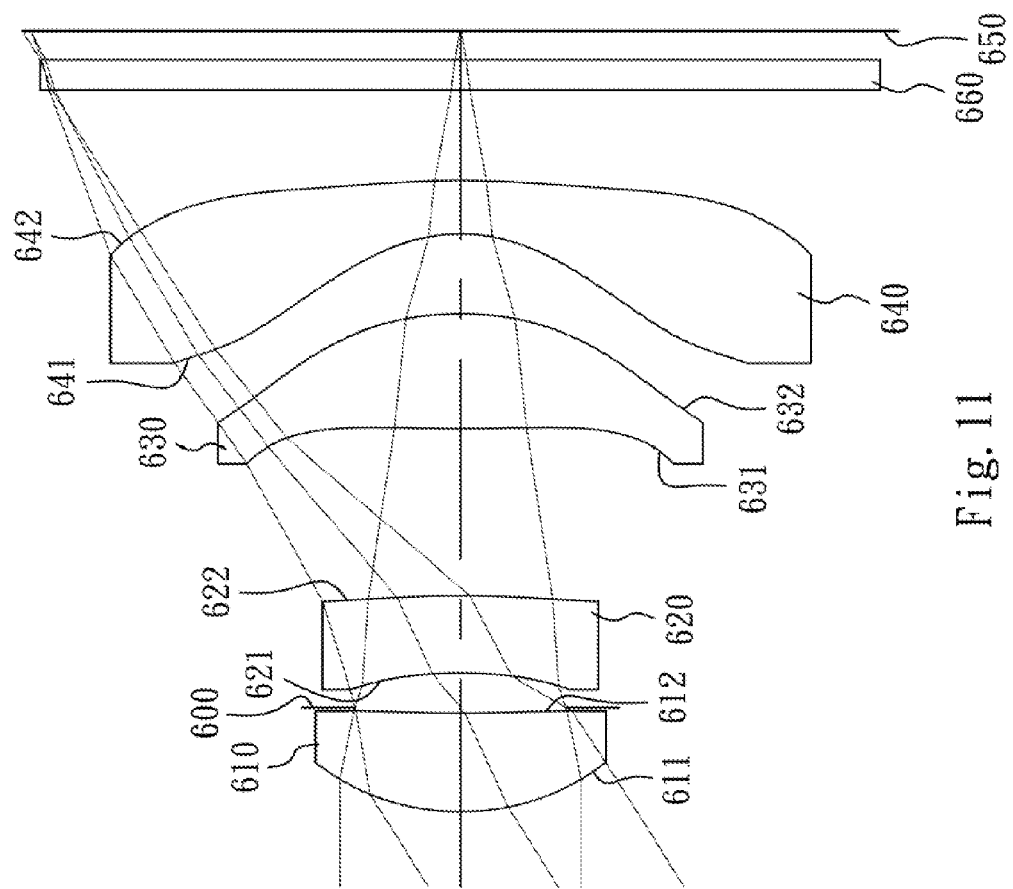
FIG. 11 is a schematic view of an optical image capturing lens assembly according to the sixth embodiment of the present disclosure.
Figure 12:
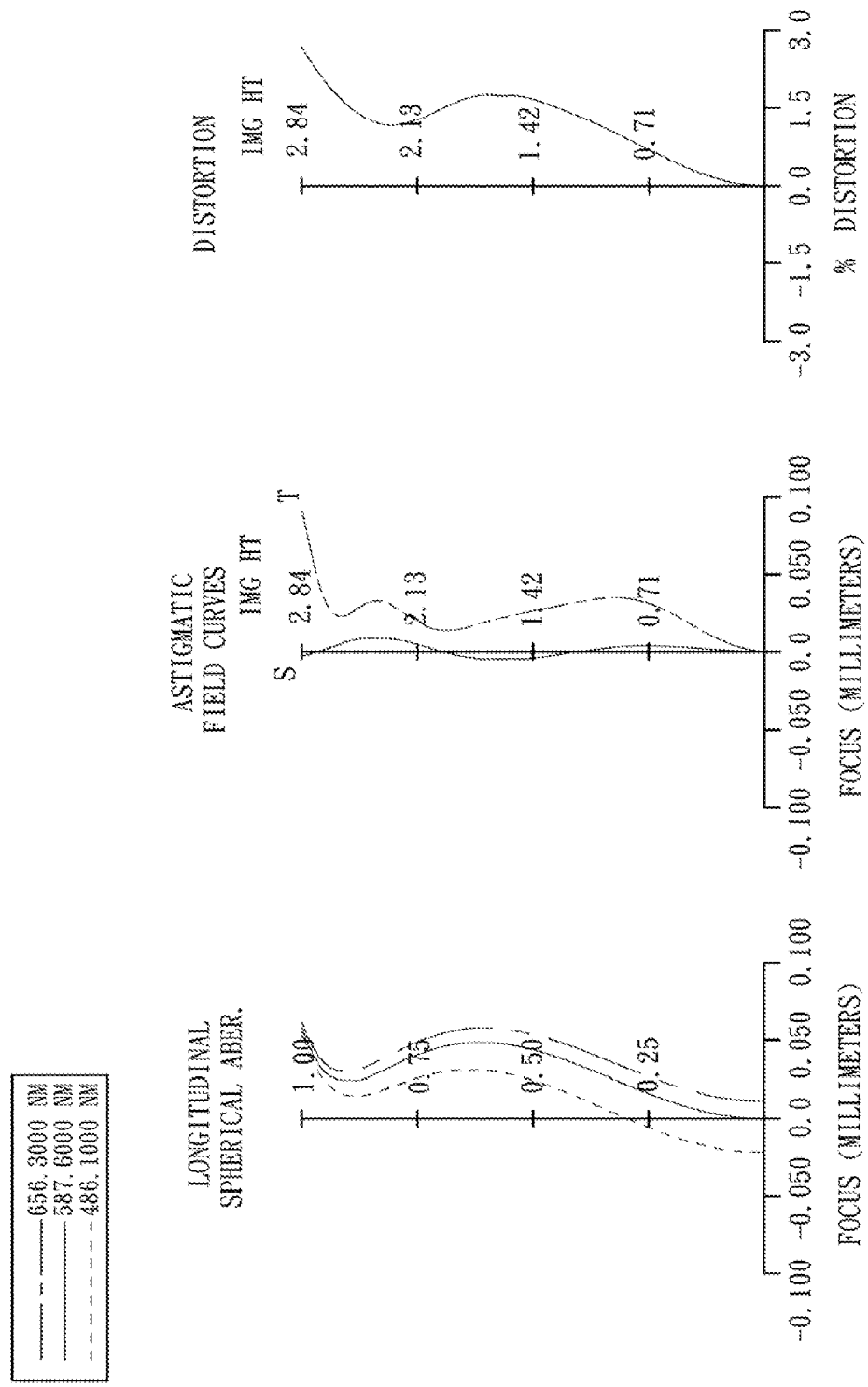
FIG. 12 shows spherical aberration curves, astigmatic field curves and a distortion curve of the optical image capturing lens assembly according to the sixth embodiment.

FIG. 11 is a schematic view of an optical image capturing lens assembly according to the sixth embodiment of the present disclosure. FIG. 12 shows spherical aberration curves, astigmatic field curves and a distortion curve of the optical image capturing lens assembly according to the sixth embodiment. In FIG. 11, the optical image capturing lens assembly includes, in order from an object side to an image side, the first lens element 610, an aperture stop 600, the second lens element 620, the third lens element 630, the fourth lens element 640, an IR cut filter 660 and an image plane 650.

The first lens element 610 with positive refractive power has a convex object-side surface 611 and a concave image-side surface 612, and is made of plastic material. The object-side surface 611 and the image-side surface 612 of the first lens element 610 are aspheric.

The second lens element 620 with negative refractive power has a concave object-side surface 621 and a convex image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The IR cut filter 660 is made of glass and located between the fourth lens element 640 and the image plane 650, and will not affect the focal length of the optical image capturing lens assembly.

The equation of the aspheric surface profiles of the above lens elements of the sixth embodiment is the same as that of the first embodiment, and will not be stated herein again.

The detailed optical data of the sixth embodiment are shown in Table 11 and the aspheric surface data are shown in Table 12 below.

TABLE 11

6th Embodiment
f = 4.36 mm, Fno = 2.74, HFOV = 32.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.644050 (ASP) | 0.653 | Plastic | 1.544 | 55.9 | 3.38 |
| 2 | | 13.477100 (ASP) | 0.035 | | | | |
| 3 | Ape. Stop | Plano | 0.226 | | | | |
| 4 | Lens 2 | −3.002600 (ASP) | 0.513 | Plastic | 1.633 | 23.4 | −7.94 |
| 5 | | −7.957600 (ASP) | 1.102 | | | | |
| 6 | Lens 3 | 10.940900 (ASP) | 0.759 | Plastic | 1.544 | 55.9 | 3.27 |
| 7 | | −2.075360 (ASP) | 0.532 | | | | |
| 8 | Lens 4 | −1.125750 (ASP) | 0.350 | Plastic | 1.530 | 55.8 | −2.72 |
| 9 | | −5.672100 (ASP) | 0.600 | | | | |
| 10 | IR-filter | Plano | 0.200 | Glass | 1.516 | 64.1 | — |
| 11 | | Plano | 0.188 | | | | |
| 12 | Image | Plano | — | | | | |

Note:
Reference wavelength (d-line) is 587.6 nm

TABLE 12

Aspheric Coefficients

| Surface # | 1 | 2 | 4 | 5 |
|---|---|---|---|---|
| k = | −3.97882E−01 | 1.42328E+01 | 1.18257E+01 | 4.55832E+01 |
| A4 = | 3.23448E−02 | 3.37887E−03 | −1.89157E−03 | 2.76627E−02 |
| A6 = | −1.74693E−02 | −4.94509E−02 | 1.65693E−01 | −4.40089E−03 |
| A8 = | 4.61583E−02 | 5.12269E−02 | −3.87712E−01 | 2.64364E−02 |
| A10 = | 2.36955E−02 | −1.02771E−01 | 4.08921E−01 | −8.12320E−03 |
| A12 = | −5.27921E−02 | −1.41578E−03 | −5.17754E−04 | 7.68124E−03 |

| Surface # | 6 | 7 | 8 | 9 |
|---|---|---|---|---|
| k = | 1.82423E+01 | 2.97683E−01 | −1.08037E+00 | 2.46004E+00 |
| A4 = | −7.07037E−02 | −4.10600E−02 | 1.22857E−02 | 5.28734E−02 |
| A6 = | 3.89685E−03 | −1.83585E−03 | 1.84041E−02 | −1.76464E−02 |
| A8 = | −3.22849E−03 | 2.12350E−02 | 3.28635E−03 | 1.15583E−03 |
| A10 = | 1.12245E−04 | −6.53066E−03 | −2.34833E−03 | 2.85897E−04 |
| A12 = | −5.00956E−04 | 7.86800E−04 | 2.34242E−04 | −3.96548E−05 |

In the optical image capturing lens assembly according to the sixth embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the sixth embodiment. Moreover, these parameters can be calculated from Table 11 as the following values and satisfy the following relationships:

| | |
|---|---|
| f (mm) | 4.36 |
| FNO | 2.74 |
| HFOV (deg.) | 32.2 |
| V1 − V2 | 32.5 |
| N1 − N2 | −0.089 |
| CT3/f | 0.17 |
| T23/T34 | 2.07 |
| R1/f | 0.38 |
| R7/f | −0.26 |
| R5/R6 | −5.27 |
| (R3 + R4)/(R3 − R4) | −2.21 |
| (R5 + R6)/(R5 − R6) | 0.68 |
| (R7 + R8)/(R7 − R8) | −1.50 |
| f/f2 | −0.55 |
| f/f4 | −1.60 |
| TTL/ImgH | 1.80 |

Figure 13:
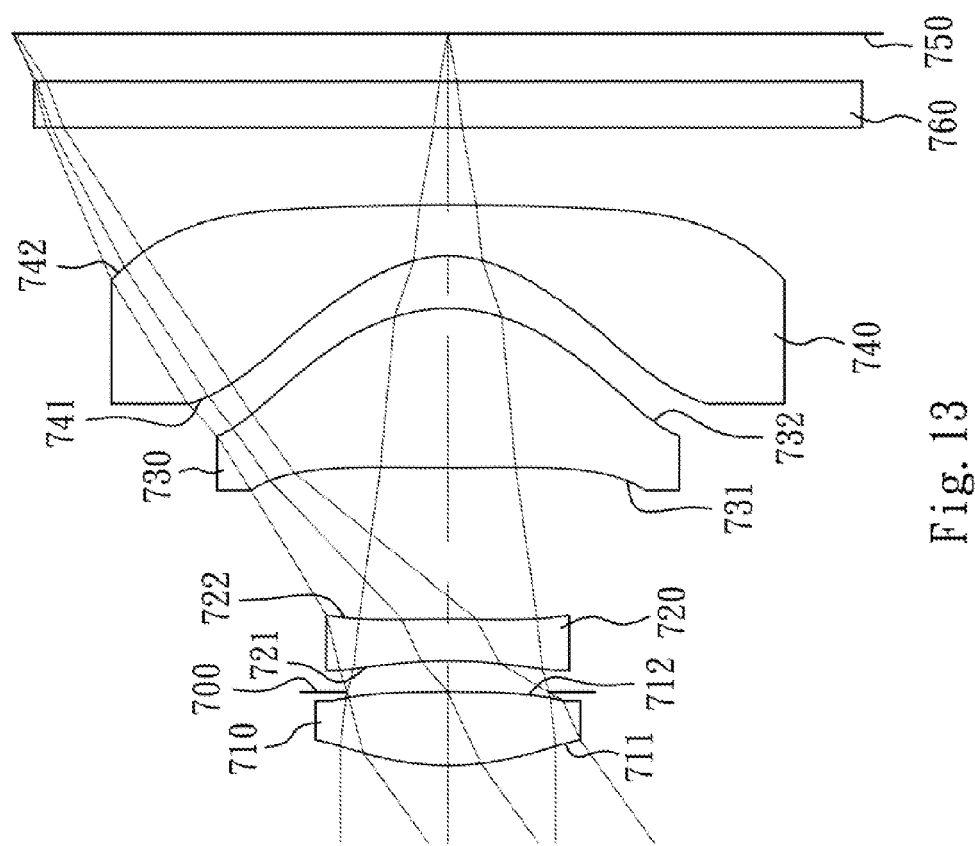
FIG. 13 is a schematic view of an optical image capturing lens assembly according to the seventh embodiment of the present disclosure.
Figure 14:
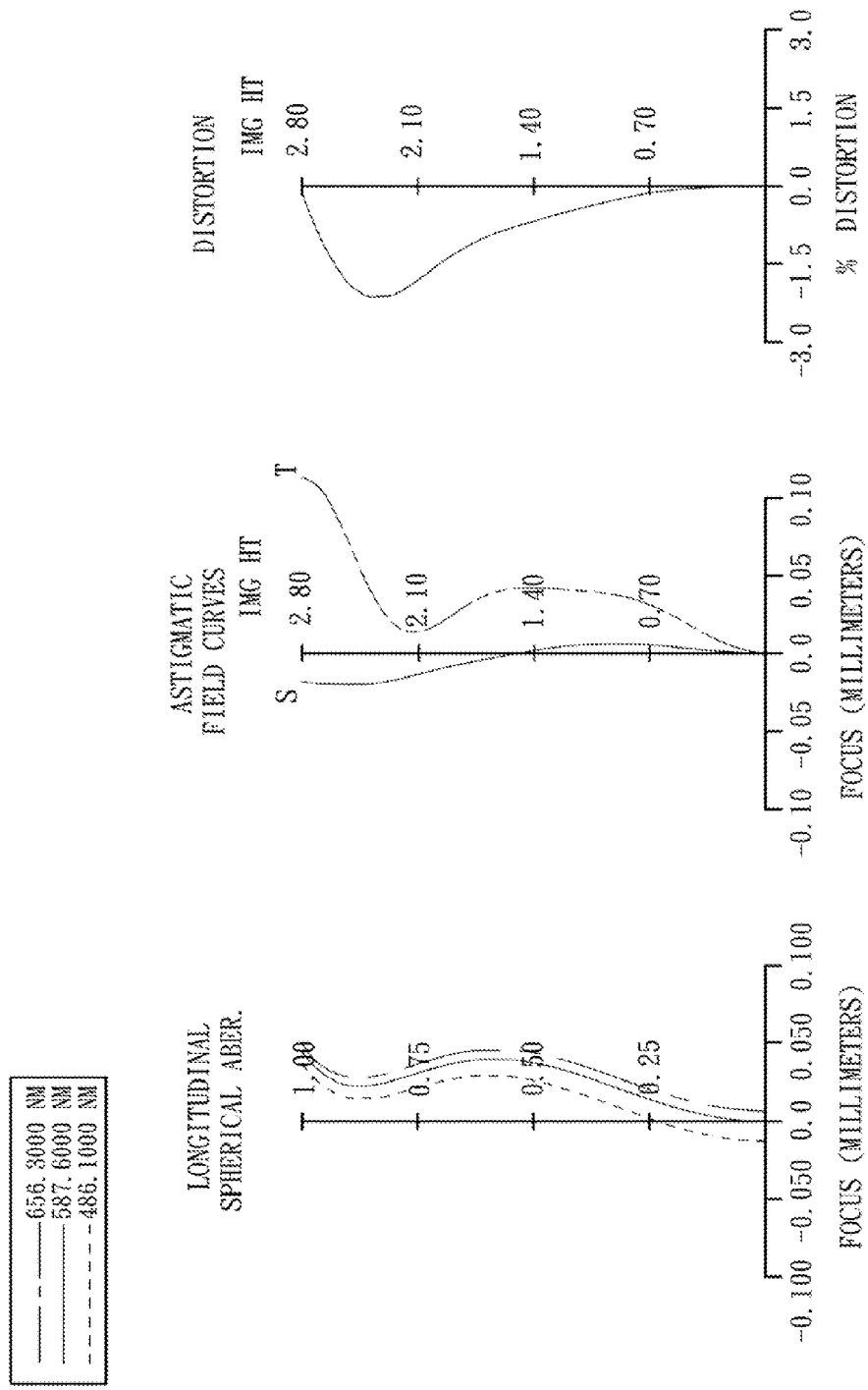
FIG. 14 shows spherical aberration curves, astigmatic field curves and a distortion curve of the optical image capturing lens assembly according to the seventh embodiment.

FIG. 13 is a schematic view of an optical image capturing lens assembly according to the seventh embodiment of the present disclosure. FIG. 14 shows spherical aberration curves, astigmatic field curves and a distortion curve of the optical image capturing lens assembly according to the seventh embodiment. In FIG. 13, the optical image capturing lens assembly includes, in order from an object side to an image side, the first lens element 710, an aperture stop 700, the second lens element 720, the third lens element 730, the fourth lens element 740, an IR cut filter 760 and an image plane 750.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a convex image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The IR cut filter 760 is made of glass and located between the fourth lens element 740 and the image plane 750, and will not affect the focal length of the optical image capturing lens assembly.

The equation of the aspheric surface profiles of the above lens elements of the seventh embodiment is the same as that of the first embodiment, and will not be stated herein again.

The detailed optical data of the seventh embodiment are shown in Table 13 and the aspheric surface data are shown in Table 14 below.

TABLE 13

7th Embodiment
f = 3.87 mm, Fno = 2.80, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.833060 (ASP) | 0.469 | Plastic | 1.544 | 55.9 | 2.82 |
| 2 | | −8.483600 (ASP) | −0.002 | | | | |
| 3 | Ape. Stop | Plano | 0.201 | | | | |
| 4 | Lens 2 | −2.831620 (ASP) | 0.273 | Plastic | 1.640 | 23.3 | −5.87 |
| 5 | | −11.958900 (ASP) | 0.973 | | | | |
| 6 | Lens 3 | 18.624700 (ASP) | 1.021 | Plastic | 1.530 | 55.8 | 1.98 |

TABLE 13-continued

7th Embodiment
f = 3.87 mm, Fno = 2.80, HFOV = 35.8 deg.

| Surface # | | Curvature Radius | Thickness | Material | Index | Abbe # | Focal length |
|---|---|---|---|---|---|---|---|
| 7 | | −1.089080 (ASP) | 0.341 | | | | |
| 8 | Lens 4 | −0.811760 (ASP) | 0.325 | Plastic | 1.530 | 55.8 | −1.63 |
| 9 | | −16.041100 (ASP) | 0.500 | | | | |
| 10 | IR-filter | Plano | 0.300 | Glass | 1.516 | 64.1 | — |
| 11 | | Plano | 0.302 | | | | |
| 12 | Image | Plano | — | | | | |

Note:
Reference wavelength (d-line) is 587.6 nm

TABLE 14

Aspheric Coefficients

| Surface # | 1 | 2 | 4 | 5 |
|---|---|---|---|---|
| k = | −1.46177E+00 | 3.46612E+01 | 3.63166E+00 | 1.39508E+02 |
| A4 = | 3.62995E−03 | −1.74871E−02 | 1.65721E−01 | 1.85233E−01 |
| A6 = | −2.59800E−02 | −6.32788E−02 | −4.06903E−02 | −7.91308E−02 |
| A8 = | −1.02655E−02 | −6.02635E−02 | −1.94399E−01 | 2.06423E−02 |
| A10 = | −3.51406E−02 | 1.74141E−02 | 2.50276E−01 | 2.07350E−02 |
| A12 = | −1.02209E−01 | −7.19969E−03 | 1.26896E−06 | 8.77957E−03 |

| Surface # | 6 | 7 | 8 | 9 |
|---|---|---|---|---|
| k = | −1.01933E+00 | −9.08151E−01 | −1.21844E+00 | −1.00000E+00 |
| A4 = | −7.17046E−02 | 1.96214E−02 | 6.75304E−02 | 1.31295E−02 |
| A6 = | 6.65184E−03 | −2.11869E−02 | −1.44937E−02 | −9.84644E−03 |
| A8 = | 4.34022E−03 | 2.68914E−02 | 7.19694E−03 | 1.04724E−03 |
| A10 = | −4.32816E−03 | −8.23457E−03 | −7.59403E−04 | −5.31026E−05 |
| A12 = | −7.86337E−04 | 1.44737E−03 | −6.23058E−05 | 3.33400E−07 |

In the optical image capturing lens assembly according to the seventh embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the seventh embodiment. Moreover, these parameters can be calculated from Table 13 as the following values and satisfy the following relationships:

| | |
|---|---|
| f (mm) | 3.87 |
| FNO | 2.80 |
| HFOV (deg.) | 35.8 |
| V1 − V2 | 32.6 |
| N1 − N2 | −0.096 |
| CT3/f | 0.26 |
| T23/T34 | 2.85 |
| R1/f | 0.47 |
| R7/f | −0.21 |
| R5/R6 | −17.10 |
| (R3 + R4)/(R3 − R4) | −1.62 |
| (R5 + R6)/(R5 − R6) | 0.89 |
| (R7 + R8)/(R7 − R8) | −1.11 |
| f/f2 | −0.66 |
| f/f4 | −2.38 |
| TTL/ImgH | 1.64 |

Figure 15:
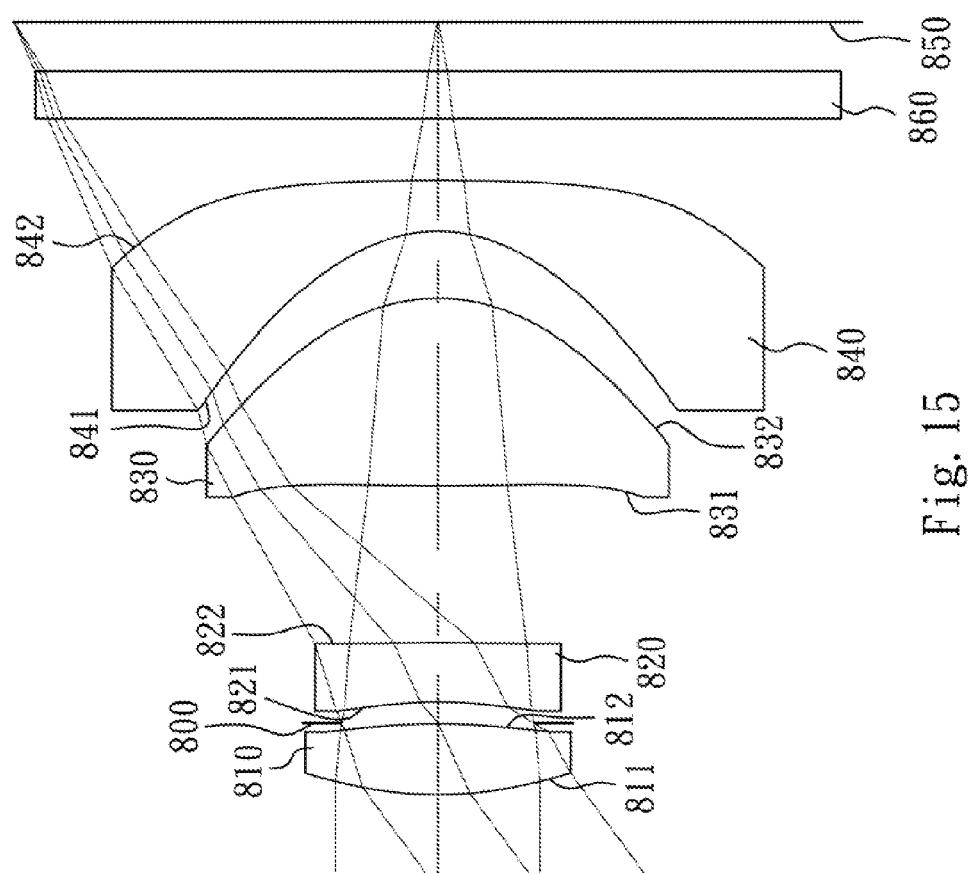
FIG. 15 is a schematic view of an optical image capturing lens assembly according to the eighth embodiment of the present disclosure.
Figure 16:
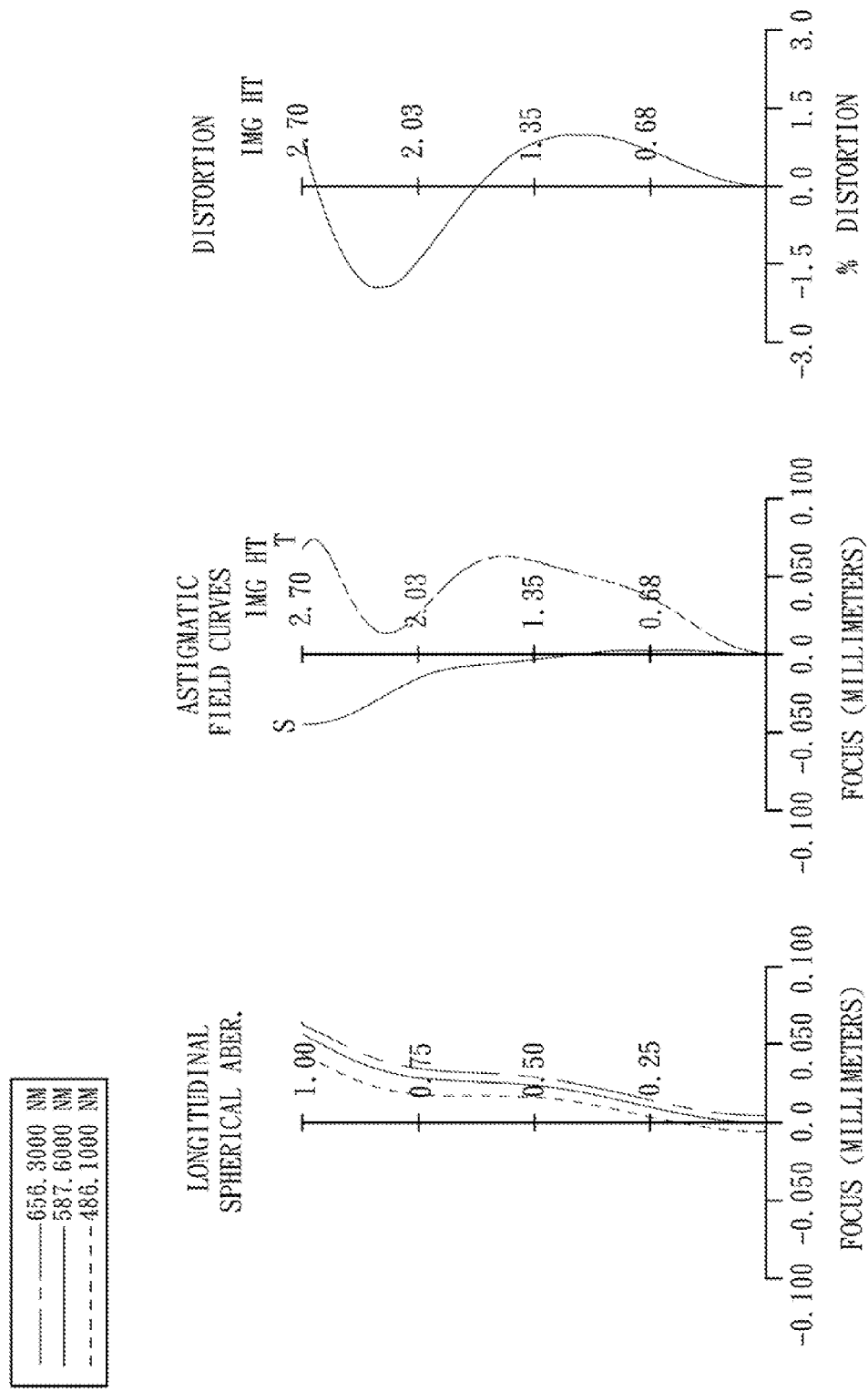
FIG. 16 shows spherical aberration curves, astigmatic field curves and a distortion curve of the optical image capturing lens assembly according to the eighth embodiment.

FIG. 15 is a schematic view of an optical image capturing lens assembly according to the eighth embodiment of the present disclosure. FIG. 16 shows spherical aberration curves, astigmatic field curves and a distortion curve of the optical image capturing lens assembly according to the eighth embodiment. In FIG. 15, the optical image capturing lens assembly includes, in order from an object side to an image side, the first lens element 810, an aperture stop 800, the second lens element 820, the third lens element 830, the fourth lens element 840, an IR cut filter 860 and an image plane 850.

The first lens element 810 with positive refractive power has a convex object-side surface 811 and a convex image-side surface 812, and is made of plastic material. The object-side surface 811 and the image-side surface 812 of the first lens element 810 are aspheric.

The second lens element 820 with negative refractive power has a concave object-side surface 821 and a convex image-side surface 822, and is made of plastic material. The object-side surface 821 and the image-side surface 822 of the second lens element 820 are aspheric.

The third lens element 830 with positive refractive power has a convex object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The IR cut filter 860 is made of glass and located between the fourth lens element 840 and the image plane 850, and will not affect the focal length of the optical image capturing lens assembly.

The equation of the aspheric surface profiles of the above lens elements of the eighth embodiment is the same as that of the first embodiment, and will not be stated herein again.

The detailed optical data of the eighth embodiment are shown in Table 15 and the aspheric surface data are shown in Table 16 below.

TABLE 15

8th Embodiment
f = 3.65 mm, Fno = 2.80, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.481010 (ASP) | 0.452 | Plastic | 1.544 | 55.9 | 2.83 |
| 2 | | −3.797000 (ASP) | 0.004 | | | | |
| 3 | Ape. Stop | Plano | 0.135 | | | | |
| 4 | Lens 2 | −2.490870 (ASP) | 0.380 | Plastic | 1.607 | 26.6 | −5.79 |
| 5 | | −9.041300 (ASP) | 1.000 | | | | |
| 6 | Lens 3 | 12.898200 (ASP) | 1.194 | Plastic | 1.530 | 55.8 | 2.07 |
| 7 | | −1.161890 (ASP) | 0.431 | | | | |
| 8 | Lens 4 | −0.974840 (ASP) | 0.320 | Plastic | 1.583 | 30.2 | −1.77 |
| 9 | | −19.636900 (ASP) | 0.400 | | | | |
| 10 | IR-filter | Plano | 0.300 | Glass | 1.516 | 64.1 | — |
| 11 | | Plano | 0.312 | | | | |
| 12 | Image | Plano | — | | | | |

Note:
Reference wavelength (d-line) is 587.6 nm

TABLE 16

Aspheric Coefficients

| Surface # | 1 | 2 | 4 | 5 |
|---|---|---|---|---|
| k = | −1.87192E+00 | −3.62045E+01 | −1.86367E+00 | 9.99150E+00 |
| A4 = | 1.23940E−03 | 1.13078E−02 | 2.04438E−01 | 1.37504E−01 |
| A6 = | −1.05364E−02 | 1.64290E−02 | −9.82662E−02 | −1.14949E−01 |
| A8 = | 2.63231E−02 | −4.92519E−02 | −2.35686E−01 | 1.39176E−02 |
| A10 = | −1.13445E−02 | −2.83581E−02 | 2.33035E−01 | −4.22944E−03 |
| A12 = | −3.73396E−02 | −1.12494E−03 | −1.33896E−02 | 1.61670E−02 |

| Surface # | 6 | 7 | 8 | 9 |
|---|---|---|---|---|
| k = | 9.99694E+00 | −8.23274E−01 | −9.21792E−01 | −1.00000E+00 |
| A4 = | −4.33619E−02 | 2.99948E−02 | 3.08283E−02 | −1.29220E−02 |
| A6 = | −5.74402E−03 | −3.34294E−02 | −1.32170E−02 | −3.72086E−03 |
| A8 = | 8.38488E−03 | 2.45732E−02 | 6.51375E−03 | −7.02680E−05 |
| A10 = | −3.69761E−03 | −8.54797E−03 | −6.14730E−04 | 9.96589E−05 |
| A12 = | −1.47195E−04 | 1.37755E−03 | −2.21461E−04 | −4.26718E−06 |

In the optical image capturing lens assembly according to the eighth embodiment, the definitions of f, Fno, HFOV, V1, V2, N1, N2, CT3, T23, T34, R1, R3, R4, R5, R6, R7, R8, f2, f4, TTL and ImgH are the same as those stated in the first embodiment with corresponding values for the eighth embodiment. Moreover, these parameters can be calculated from Table 15 as the following values and satisfy the following relationships:

| f (mm) | 3.65 |
|---|---|
| FNO | 2.80 |
| HFOV (deg.) | 36.1 |
| V1 − V2 | 29.3 |
| N1 − N2 | −0.063 |
| CT3/f | 0.33 |
| T23/T34 | 2.32 |
| R1/f | 0.68 |
| R7/f | −0.27 |
| R5/R6 | −11.10 |
| (R3 + R4)/(R3 − R4) | −1.76 |
| (R5 + R6)/(R5 − R6) | 0.83 |
| (R7 + R8)/(R7 − R8) | −1.10 |
| f/f2 | −0.63 |
| f/f4 | −2.06 |
| TTL/ImgH | 1.79 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing lens assembly comprising four non-cemented lens elements, in order from an object side to an image side:

a first lens element with positive refractive power having an object-side surface being convex in a paraxial region thereof;

a second lens element with negative refractive power having an object-side surface being concave in a paraxial region thereof and an image-side surface being convex in a paraxial region thereof;

a third lens element with positive refractive power having an object-side surface being convex in a paraxial region thereof and an image-side surface being convex in a paraxial region thereof, and made of plastic material, wherein the object-side surface and the image-side surface of the third lens element are aspheric; and a fourth lens element with negative refractive power having an object-side surface being concave in a paraxial region thereof and an image-side surface being convex in a paraxial region thereof, and made plastic material, wherein the object-side surface and the image-side surface of the fourth lens element are aspheric;

wherein a curvature radius of the object-side surface of the third lens element is R5, a curvature radius of the image-side surface of the third lens element is R6, an axial distance between the second lens element and the third lens element is T23, and an axial distance between the third lens element and the fourth lens element is T34, the following relationships are satisfied:

0.54≤(R5+R6)/(R5−R6)<1, and 1.34≤T23/T34<6.5.

2. The optical image capturing lens assembly of claim 1, wherein the second lens element is made of plastic material, and at least one of the object-side surface and the image-side surface of the second lens element is aspheric.

3. The optical image capturing lens assembly of claim 2, wherein a curvature radius of the object-side surface of the second lens element is R3, and a curvature radius of the image-side surface of the second lens element is R4, the following relationship is satisfied:

−3.5<(R3+R4)/(R3−R4)<−1.0.

4. The optical image capturing lens assembly of claim 3, wherein a curvature radius of the object-side surface of the fourth lens element is R7, and a focal length of the optical image capturing lens assembly is f, the following relationship is satisfied:

−0.6<R7/f<0.

5. The optical image capturing lens assembly of claim 4, wherein an Abbe number of the first lens element is V1, and an Abbe number of the second lens element is V2, the following relationship is satisfied:

30<V1−V2<42.

6. The optical image capturing lens assembly of claim wherein the focal length of the optical image capturing lens assembly is f, a focal length of the second lens element is f2, the following relationship is satisfied:

−0.9<f/f2<−0.3.

7. The optical image capturing lens assembly of claim 4, wherein a refractive index of the first lens element is N1, and a refractive index of the second lens element is N2, the following relationship is satisfied:

−0.25<N1−N2<0.

8. The optical image capturing lens assembly of claim 4, wherein a central thickness of the third lens element is CT3, and the focal length of the optical image capturing lens assembly is f, the following relationship is satisfied:

0.1<CT3/f<0.5.

9. The optical image capturing lens assembly of claim 8, wherein the focal length of the optical image capturing lens assembly is f, and a focal length of the fourth lens element is f4, the following relationship is satisfied:

−2.5<f/f4<−0.75.

10. The optical image capturing lefts assembly of claim 2 wherein a curvature radius of the object-side surface of the first lens element is R and a focal length of the optical image capturing lens assembly is f, the following relationship is satisfied:

0.2<R1/f<1.0.

11. The optical image capturing lens assembly of claim 2, wherein the axial distance between the second lens element and the third lens element is T23, and the axial distance between the third lens element and the fourth lens element is T34, the following relationship is satisfied:

1.34<T23/T34<3.1.

12. The optical image capturing lens assembly of claim 3, wherein a curvature radius of the object-side surface of the fourth lens element is R7, and a curvature radius of the image-side surface of the fourth lens element is R8, the following relationship is satisfied:

−3.0<(R7+R8)/(R7−R8)<−1.0.

13. The optical image capturing lens assembly of claim 3, further comprising:

an image sensor located on an image plane, wherein a maximum image height of the optical image capturing lens assembly is ImgH, and an axial distance between the object-side surface of the first lens element and the image plane is TTL, the following relationship is satisfied:

TTL/ImgH<1.95.

14. An optical image capturing lens assembly comprising four non-cemented lens elements, in order from an object side to an image side:

a first lens element with positive refractive power having an object-side surface being convex in a paraxial region thereof;

a second lens element with negative refractive power having an object-side surface being concave in a paraxial region thereof and an image-side surface being convex in a paraxial region thereof;

a third lens element with positive refractive power having an object-side surface being convex in a paraxial region thereof and an image-side surface being convex in a paraxial region thereof, and made of plastic material, wherein the object-side surface and the image-side surface of the third lens element are aspheric; and a fourth lens element with negative refractive power having an object-side surface being concave in a paraxial region thereof and an image-side surface being convex in a paraxial region thereof, and made of plastic material, wherein the object-side surface and the image-side surface of the fourth lens ent are aspheric;

wherein a refractive index of the first lens element is N1, a refractive index of the second lens element is N2, a curvature radius of the object-side surface of the third lens element is R5, and a curvature radius of the image-side surface of the third lens element is R6, an axial' distance between the second lens element and the third lens element is T23, and an axial distance between the third lens element and the fourth lens element is T34, the following relationships are satisfied:

−0.25<N1−N2<0;

0.54≤(R5+R6)/(R5−R6)<1; and 1.34<T23/T34<6.5.

15. The optical image capturing lens assembly of claim 14, wherein the curvature radius of the object-side surface of the third lens element is R5, and the curvature radius of the image-side surface of the third lens element is R6, the following relationship is satisfied:

0.54≤(R5+R6)/(R5−R6)<0.9.

16. The optical image capturing lens assembly of claim 14, wherein a focal length of the optical image capturing lens assembly is f, and a focal length of the second lens element is f2, the following relationship is satisfied:

$-0.9 < f/f2 < -0.3$.

17. The optical image capturing lens assembly of claim 14, wherein a curvature radius of the object-side surface of the fourth lens element is R7, and a focal length of the optical image capturing lens assembly is f, the following relationship is satisfied:

$-0.6 < R7/f < 0$.

18. The optical image capturing lens assembly of claim 17, wherein a curvature radius of the object-side surface of the first lens element is R1, and the focal length of the optical image capturing lens assembly is f, the following relationship is satisfied.

$0.2 < R1/f < 1.0$.

19. The optical image capturing lens assembly of claim 17, wherein the axial distance between the second lens element and the third lens element is T, the axial distance between the third lens element and the fourth lens element is T34, the following relationship is satisfied:

$1.34 \leq T23/T34 < 3.1$.

* * * * *

UNITED STATES PATENT AND TRADEMARK OFFICE
CERTIFICATE OF CORRECTION

PATENT NO. : 8,982,483 B2  
APPLICATION NO. : 13/354332  
DATED : March 17, 2015  
INVENTOR(S) : Ming-Ta Chou and Tsung-Han Tsai Page 1 of 1

It is certified that error appears in the above-identified patent and that said Letters Patent is hereby corrected as shown below:

In the Claims

In column 27, line 1, Claim 1 reads as "made plastic material", but it should read as "made of plastic material".

In column 27, line 38, Claim 6 reads as "The optical image capturing lens assembly of claim wherein", but it should read as "The optical image capturing lens assembly of claim 4, wherein".

In column 27, line 63, Claim 10 reads as "first lens element is R", but it should read as "first lens element is R1".

In column 28, line 6, Claim 11 reads as "$1.34<T23/T34<3.1$", but it should read as "$1.34 \leq T23/T34<3.1$".

In column 28, line 46, Claim 14 reads as "fourth lens ent", but it should read as "fourth lens element".

In column 28, line 51, Claim 14 reads as "an axial'", but it should read as "an axial".

In column 28, line 60, Claim 14 reads as "$1.34<T23/T34<6.5$", but it should read as "$1.34 \leq T23/T34<6.5$".

In column 29, line 22, Claim 19 reads as "third lens element is T", but it should read as "third lens element is T23".

Signed and Sealed this  
Eighteenth Day of August, 2015

Michelle K. Lee  
*Director of the United States Patent and Trademark Office*